United States Patent [19]

Ostby et al.

[11] Patent Number: 5,326,270

[45] Date of Patent: Jul. 5, 1994

[54] SYSTEM AND METHOD FOR ASSESSING AN INDIVIDUAL'S TASK-PROCESSING STYLE

[75] Inventors: David L. Ostby, Issaquah, Wash.; Shari Marihugh, 20631 - 303rd SE., Maple Valley, Wash. 98038; Paul S. Ostby, Kirkland, Wash.

[73] Assignees: IntroSpect Technologies, Inc., Seattle; Shari Marihugh, Hobart, both of Wash.

[21] Appl. No.: 751,548

[22] Filed: Aug. 29, 1991

[51] Int. Cl.$^5$ .............................................. G09B 7/00
[52] U.S. Cl. .................................. 434/362; 434/118; 434/219; 434/323; 434/335; 395/155; 395/927
[58] Field of Search ............... 434/118, 219, 236, 307, 434/322, 323, 234, 335, 362, 365; 364/419, 578; 340/712, 825.31; 385/100, 118, 152, 154, 155, 156, 159, 161, 600, 927

[56] References Cited

U.S. PATENT DOCUMENTS 4,060,915 12/1977 Conway .
4,518,361 5/1985 Conway .
4,671,772 6/1987 Slade et al. .
4,895,518 1/1990 Arnold et al. .

OTHER PUBLICATIONS

Quinn, Clark N., "Computers for cognitive research: A HyperCard adventure game," Behavior Research Methods, Instruments, & Computers, 1991, vol. 23, No. (2), pp. 237–246, Psychonomic Society, Inc.

Dahlstrand et al., "Information Search and Evaluative Processes in Decision Making: A Computer Based Process Tracing Study," Acta Psychologica 56 (1984), pp. 113–123, Elsevier Science Publishers B.V. (North-Holland).

Earley et al., "Impact of Process and Outcome Feedback on the Relation of Goal Setting to Task Performance," Academy of Management Journal, 1990, vol. 33, No. 1, pp. 87–105.

Engelmann et al., "Divergent Thinking in Act Generation," Acta Psychologica, vol. 60 (1985) pp. 39–56, Elsevier Science Publishers B.V. (North-Holland).

Wellens et al., "The C.I.T.I.E.S. Game A Computer-Based Situation Assessment Task for Studying Distributed Decision Making," Simulations & Games, vol. 19, No. 3, Sep. 1988, pp. 304–327, Sage Publications, Inc.

Primary Examiner—Richard J. Apley
Assistant Examiner—Joe H. Cheng

[57] ABSTRACT

A method and apparatus for evaluating the task-processing style of an individual by presenting that individual with a simulated situation and recording the individual's responses while resolving the situation. A subject undergoing the assessment is asked to assume the responsibilities of an Assistant Superintendent of Parks, replacing an individual who has unexpectedly left that position. The subject is first trained in the use of a touch-sensitive screen display for accessing data that may be useful in fulfilling the responsibilities of the simulated position and for providing input data used in the exercise. Each action by the subject undergoing the assessment is recorded in a raw data stream, along with the time that it occurred, and is statistically analyzed with respect to several parameters that define the subject's task-processing style. These parameters are useful in determining whether an individual is suitable for a job and for other assessment purposes, or can be used for training a subject to improve the subject's ability and efficiency in dealing with tasks.

28 Claims, 26 Drawing Sheets

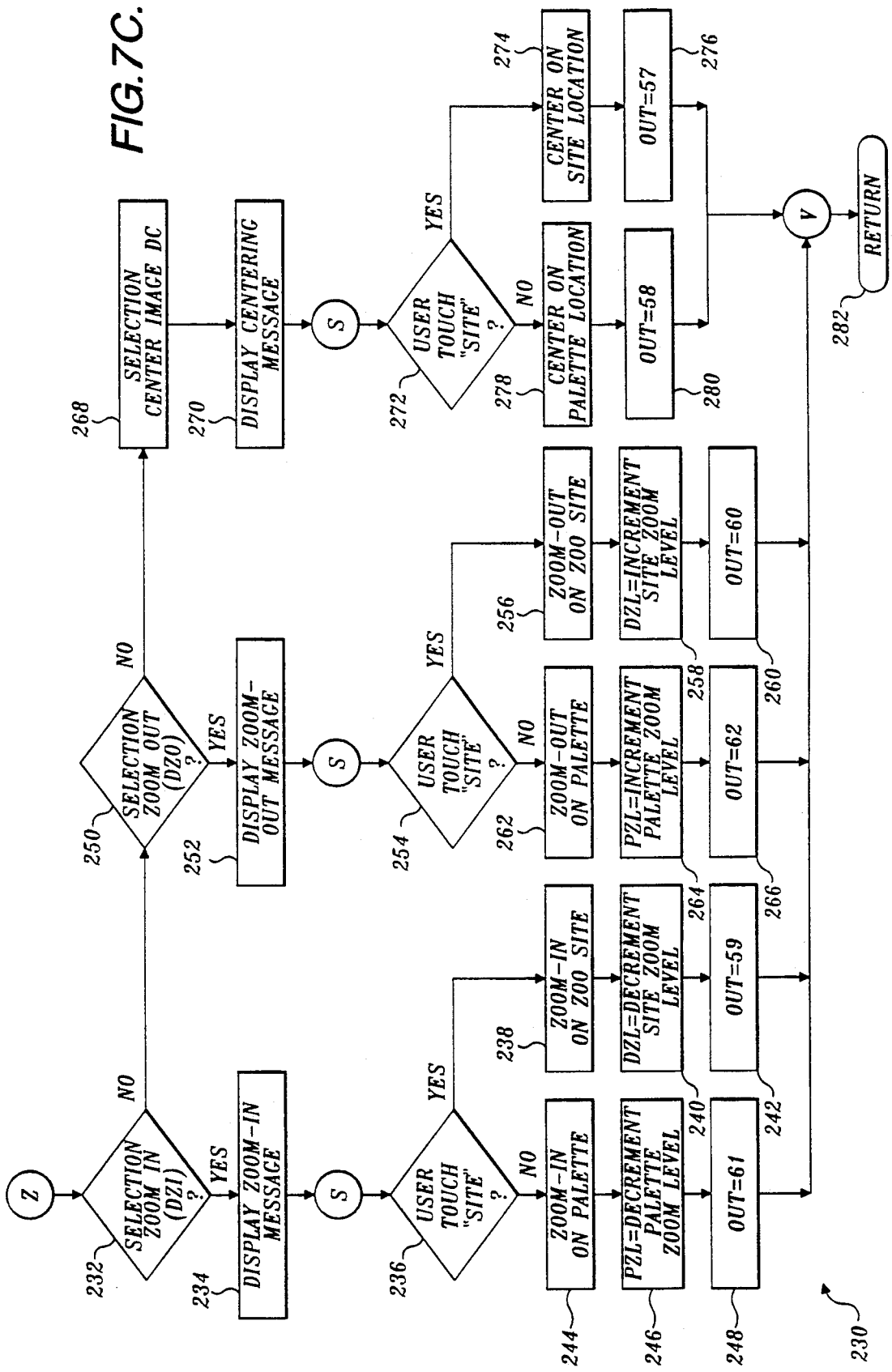

CONCEPTIONAL    SELECTIVE                    IMPLEMENTIVE

CONCEPTIONAL | SELECTIVE |            IMPLEMENTIVE

RANDOM　　　　　　　　METHODICAL

SYSTEM AND METHOD FOR ASSESSING AN INDIVIDUAL'S TASK-PROCESSING STYLE

FIELD OF THE INVENTION

The present invention generally pertains to a system and a method for psychologically testing an individual, and more specifically, for evaluating an individual's response and behavior when presented with a problem.

BACKGROUND OF THE INVENTION

People often seek employment at jobs for which they are not well suited. The prospective employee may be influenced by salary, location, responsibility, esteem, and other desirable aspects of a position. Unfortunately, factors in the individual's personality, attitude, and task-processing style may cause the person to be unhappy with the job and unable to perform at a level consistent with the employer's expectations. Accordingly, it is likely that the employee will either quit after a short time on the job, or perform poorly so that both the employee and the employer will be dissatisfied.

To avoid this result, some corporations have begun to use personality profile tests that attempt to determine whether a prospective employee possesses certain characteristics that are believed appropriate and important in an employee selected to fill a specific position. These tests usually include multiple choice questions, a subjective evaluation by a psychologist, or both. While such tests may give some insight into certain aspects of the applicant's personality, they are generally incapable of answering more critical issues that directly affect the person's likely satisfaction with the job and subsequent performance if hired.

Prior art psychological tests have not included effective tools for assessing how an individual will process tasks, i.e., to determine a person's task-processing style. Instead, such tests try to develop data that describe the examinee's personality traits. This information may be useful in determining whether a person is trustworthy or for predicting an individual's ability to learn a new skill, but it does not help in evaluating the person's task-processing style.

Virtually every job involves some form of task-processing activity. The problems that arise on a job may be long-term tasks that must be completed by developing a multi-faceted solution, or, may simply represent the daily, routine decisions that an employee must make. Some courses of action or decisions are made only after assimilating a multitude of data, or alternatively, may be based on nothing more than an opinion. Regardless of the complexity of the situation, each individual typically exhibits a characteristic style in processing a task. One person may repetitively review all available data before beginning a task; another person may make decisions or start a task with only a minimal input of available data.

Determining an individual's task-processing style is particularly important if a significant portion of the employee's job involves processing tasks in prescribed ways. Accordingly, there is a need for an assessment that an employer can make of a prospective employee to determine the individual's characteristic task-processing style. The assessment should determine how an individual handles a situation, how the person processes data that can be used in resolving the situation, and how the person goes about developing a resolution to the situation. To minimize costs, the assessment should efficiently evaluate individual characteristics of a person's task-processing style using objective criteria that are subjectively applied to determine a person's suitability for a job. An assessment of this type would also be valuable in the fields of education, personal career evaluation, and in health sciences.

Several studies have been made of how people process and evaluate information in making a decision. For example, U. Dahlstrand and H. Montgomery reported on such a study in their paper "Information Search And Evaluative Processes In Decision Making: A Computer Based Process Tracing Study" *Acta Psychologics*, Vol. 56 (1984), pp 113-123. In this study, 26 subjects were asked to choose among five flats (apartments) by interacting with a computer on which information about each flat was available. Each flat was described in detail with regard to eight attributes, including rent, location, size, quality, floor plan, type of structure, surroundings, and access to public transportation. For each subject, the computer recorded the sequence of data accessed by the subject, a rating of the attractiveness of each presented aspect, and ratings of eligibility of each alternative after each tenth aspect presentation, along with the latency of each aspect presentation. The data compiled on the computer for each subject were analyzed to determined the number of times the subject requested information on an alternative and then ranked the alternatives by the amount of attention paid to them by the subject. However, this study was not intended to evaluate a particular individual's task-processing style; instead, it served to provide general and statistical information about how a group of subjects reached a decision so that the investigators could better understand the decision-making process.

In a report entitled, "The C.I.T.I.E.S. Game—A Computer-Based Situation Assessment Task for Studying Distributed Decision Making" by A. Rodney Wellens and D. Etgener, published in *Simulation & Games*, Vol. 19, No. 3, September 1988, pp. 304-327, a game developed for conducting empirical research on strategic decision making is described. This game is played by a group of four subjects that are divided into a fire-rescue team and a police-tow team of two members each. The teams are each instructed to respond to simulated emergencies and are given the task of protecting the lives and property of the inhabitants of an imaginary township. A touch-sensitive computer monitor displays city maps on which emergencies are identified as they arise in the imaginary township. Various icons graphically represent the types of emergencies that occur and indicate the appropriate team to respond. For each region displayed on the city maps, selectable information screens are provided that describe any emergency arising within that region in greater detail. More information is also available to the teams by successively touching a dialog box portion of the screen labeled "MORE INFO," by causing a succession of summary charts to be presented on the monitor. The teams respond to the emergencies by assigning resources such as fire trucks or squad cars to handle the emergency. If the assigned resources are insufficient, the controller causes the emergency icon on the screen to remain red; the icon turns purple if events accelerate out of control. Resources can be reassigned to higher priority emergencies, if the team chooses to do so. The computer records data indicating the amount of information sought by each team before assigning resources to an emergency and includes variable "growth" curves that define how the event magnitudes and frequency of events are determined.

By studying the data produced by teams playing the C.I.T.I.E.S. game under different conditions, the researchers have evaluated the effects of team-to-team communication bandwidth (i.e., team intercontact, computer conferencing, audio conferencing, and two-way TV) upon situation assessment, social dynamics, and team effectiveness. The report also suggests that the game can be used "as a diagnostic and training tool," noting that "considerable individual differences in event and team 'management' style" have been evident. However, the report does not suggest or teach how the game might be used for assessing an individual's task-processing style; it appears that the game is more suited to evaluating the manner in which people work together in a team.

Although each of the above-noted studies have made use of a computer for presenting information to subjects being evaluated and for collecting data covering the subjects' response to a situation, these studies and other related prior art do not disclose how to identify or quantify a specific individual's characteristic approach to resolving a situation or carrying out a task. Information that defines an individual's characteristic task-processing style might include: the extent to which a person accesses input data before producing output, i.e., starts processing the task; an indication of how decisive versus selective the person is in making decisions; the nature of the person's output, i.e., whether conceptual, selective, or implementive; data showing how methodical the person is in processing information, i.e., input data, in resolving a situation; and an indication of whether the person tends to work on specific parts of a resolution or is very general in developing a resolution to a situation. Use of a computer to quickly and objectively assess a person's task-processing style is clearly important to eliminate subjective bias and to efficiently complete the evaluation of the individual's task-processing style within a reasonable time.

Accordingly, it is an object of the present invention to provide a method and apparatus for assessing the task-processing style of an individual. A further object is to evaluate the individual's task-processing style by presenting the person with a relatively complex, but loosely structured task and to provide the individual with many different sources of information that are relevant to processing the task. A still further object is to conduct the evaluation with a computer, and thus, to efficiently collect data useful in assessing the person's task-processing style. Another object is, prior to beginning the assessment, to train the person to: use the computer, access the information that may be helpful in resolving the situation, and input a resolution to the task. Finally, it is an object to process the data collected for the individual during the exercise and to produce objective parameters that define how the person resolves situations. The foregoing aspects and many further attendant advantages of this invention will become apparent by reference to the accompanying drawings and the Detailed Description of the Preferred Embodiment, which follows.

SUMMARY OF THE INVENTION

In accordance with the present invention, a method for assessing a task-processing style of an individual includes the steps of defining a simulated situation for the individual with scenario data, presented to the individual on a computer-controlled display. Resource data are made available to the individual on the computer-controlled display so that the individual can optionally select and review the resource data, which are, at least in part, usable by the individual to resolve the simulated situation. Each access of the resource data made by the individual, and any responses produced by the individual to resolve the simulated situation, are recorded, producing raw subject data. The raw subject data are statistically analyzed to produce a statistical database in which are compiled the accesses made by the individual of the resource data and the responses of the individual to resolve the simulated situation. Using the statistical database, a report is generated that characterizes the task-processing style of the individual with respect to a plurality of preselected parameters that are determined according to a set of predefined rules.

Before assessing the individual's task-processing style, training is provided to assist the individual in learning to use the computer-controlled display and in entering specific response data that represent a resolution of the simulated situation. This training thus familiarizes the individual with the equipment so that the assessment can proceed.

To access the resource data, the individual is provided with a plurality of screens that are each selectively displayed on the computer-controlled display. Each screen presents a different aspect of the resource data. A plurality of graphic icons are also displayed on the computer-controlled display so that when selected by the individual, a different aspect of the resource data is presented.

The available resource data are preferably organized as a plurality of data types that are presented to the individual on the computer-controlled display as a plurality of choices from which the individual can elect to view at least one data type on the computer-controlled display at a time. Selection of one of the plurality of data types by the individual causes additional choices of resource data to be opened on the computer-controlled display for selection by the individual. Each selection by the individual comprises an access of the resource data that is recorded in the sequential order that it occurs and is characterized as an "input" to the individual in producing the raw subject data. The individual is also presented with a plurality of choices on the computer-controlled display from which the individual can select at least one choice to develop at least a partial resolution of the simulated situation, and the choice is recorded as part of the raw subject data.

The step of statistically analyzing the raw subject data includes determining the sequential order and frequency of the input and output to and from the individual. Based on this raw subject data, the step of generating the report comprises the step of defining a relative order and frequency of input and output by the individual.

The output of the individual is characterized as comprising a plurality of types of production. The step of statistically analyzing the raw subject data includes determining the relative proportion of output from the individual that is of each type of production. The types of production preferably include conceptual, selective, and implementive. In generating the report, the types of production exhibited by the individual in resolving the simulated situation and their relative proportion are defined.

A plurality of options organized as an array on the computer-controlled display are presented to the individual. The sequential order in which each of the options is selectively accessed by the individual is recorded as part of the raw subject data. By analyzing this raw subject data, a determination of the individual's methodicalness is determined. The step of generating the report includes the step of defining the methodicalness of the individual as one of the preselected parameters.

An average number of accesses of the resource data made before the individual makes a decision in resolving the simulated situation determines how decisive or selective the individual is. A decisive/selective characteristic for the individual is defined as one of the preselected parameters when generating the report.

A resolution of the simulated situation comprises a plurality of loosely defined components. The step of statistically analyzing the raw subject data includes the step of determining an extent to which sequential responses by the individual in resolving the simulated situation were directed to a specific component of the resolution, indicating that the individual exhibits a specific implementation method, or alternatively, determining an extent to which the individual's sequential responses were generally directed to different components, indicating that the individual exhibits a general implementation method. Accordingly, when generating the report, a general/specific characteristic for the individual is defined as one of the preselected parameters.

The step of generating the report preferably includes the step of producing a graphic representation of a corresponding task-processing characteristic of the individual, which is one of the preselected parameters.

A system for assessing an individual's task-processing style is a further aspect of this invention. The system generally includes means for carrying out the functions performed in the steps of the method just described.

BRIEF DESCRIPTION OF THE DRAWINGS

FIGS. 7A and 7C–7I are flow charts showing subroutines used in accepting an individual's input when designing a zoo layout and in controlling the display of the zoo layout and icons selected by the individual;

DETAILED DESCRIPTION OF THE PREFERRED EMBODIMENT

Figure 1:
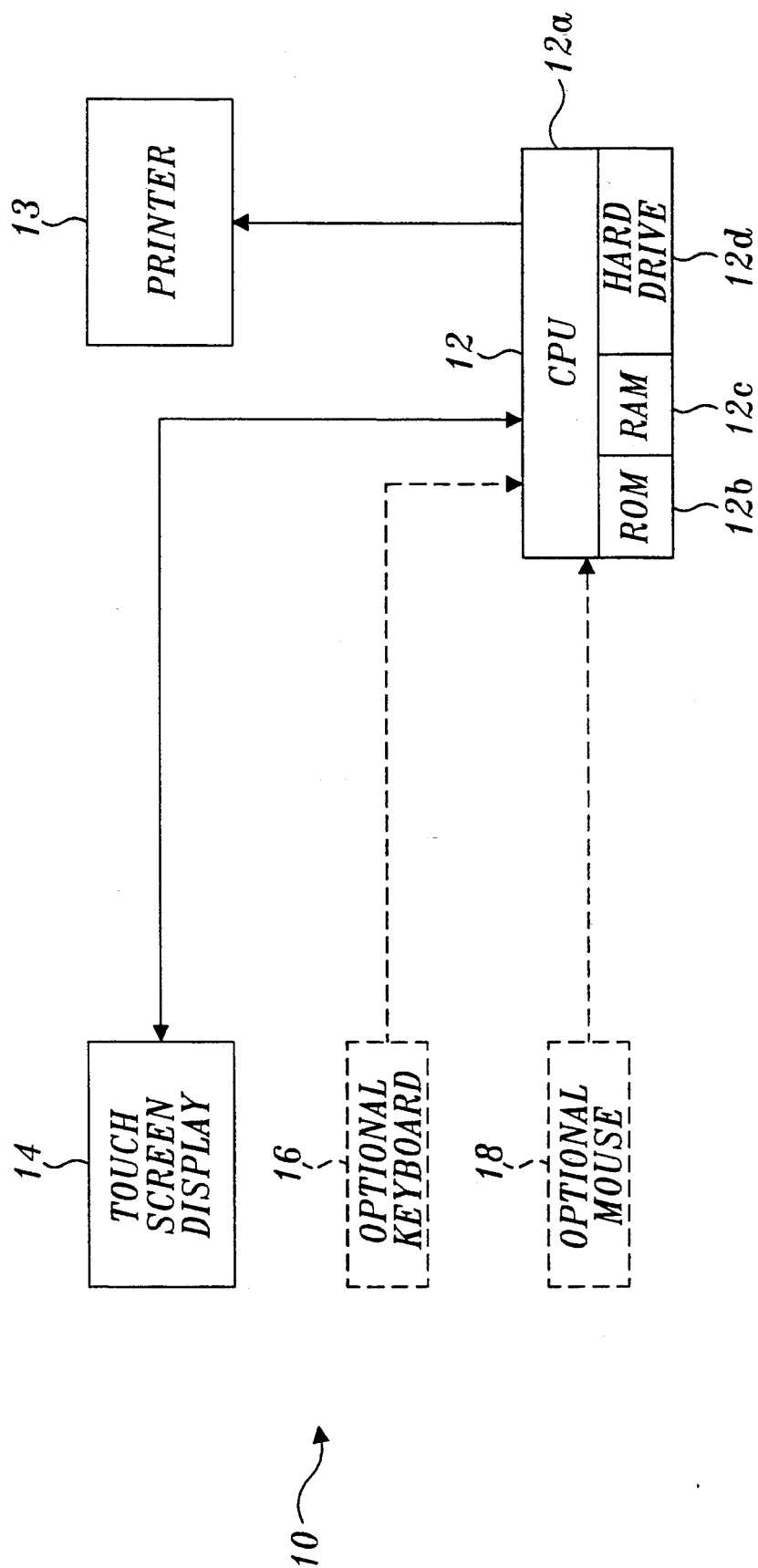
FIG. 1 is a block diagram of the computer system used to assess an individual's task-processing style.

With reference to FIG. 1, apparatus for determining the task-processing style of an individual are shown generally at reference numeral 10. In the preferred embodiment, apparatus 10 includes a conventional personal computer, such as a PC-AT, having a central processing unit (CPU) 12a, which preferably comprises an 80386 or equivalent processor. In addition, personal computer 12 includes a read only memory (ROM) 12b, which is used for storing instructions causing the CPU to load and run programs, and a random access memory (RAM) 12c, which is used for volatile storage of program instructions during execution of a program, variables, and other data. Personal computer 12 further includes a hard disk drive 12d, which provides magnetic storage of programs and data, and may include one or more floppy disk drives (not separately shown).

In addition, apparatus 10 preferably includes a touch-sensitive screen display 14 that is used to display graphic and text data that define the task presented to the subject undergoing the assessment. Touch-sensitive screen display 14 responds to the subject's touching a specific portion of the screen to indicate a response, by transmitting a signal to CPU 12a indicating the row and column touched, thereby enabling the subject to provide input data during the exercise. Optionally, the apparatus can include other types of pointing devices or data entry devices, including a keyboard 16 for entry of text data and controlling a cursor position on touch-sensitive screen display 14 or conventional keypad cursor controls (not shown). Due to variations in each subject's aptitude for typing, optional keyboard 16 is a less preferred data entry and pointing device than touch-sensitive screen display 14. However, when used for evaluating subjects familiar with data entry using a keyboard, it may provide a more expedient means for entering data and pointing to areas of the display.

Similarly, an optional mouse 18 can be used as a pointing device to control the position of a cursor on touch-sensitive screen display 14 and to enter data selected with the mouse controls. It should be apparent that if optional keyboard 16 and/or optional mouse 18 are provided, a more conventional screen display can be used instead of touch-sensitive screen display 14, since the subject would then be able to point and enter data without the benefit of a touch-sensitive screen display.

Apparatus 10 also preferably includes a printer 13, connected to computer 12, for printing a report that defines the individual's task-processing style with respect to a plurality of predefined parameters. It should be apparent that computer 12 can comprise a network server and the touch-sensitive display screen or other data entry and pointing device can be one of a plurality of terminals connected thereto in a local area network, thereby enabling a plurality of individuals to undergo the exercise and assessment simultaneously with a minimum of hardware.

Figure 2:
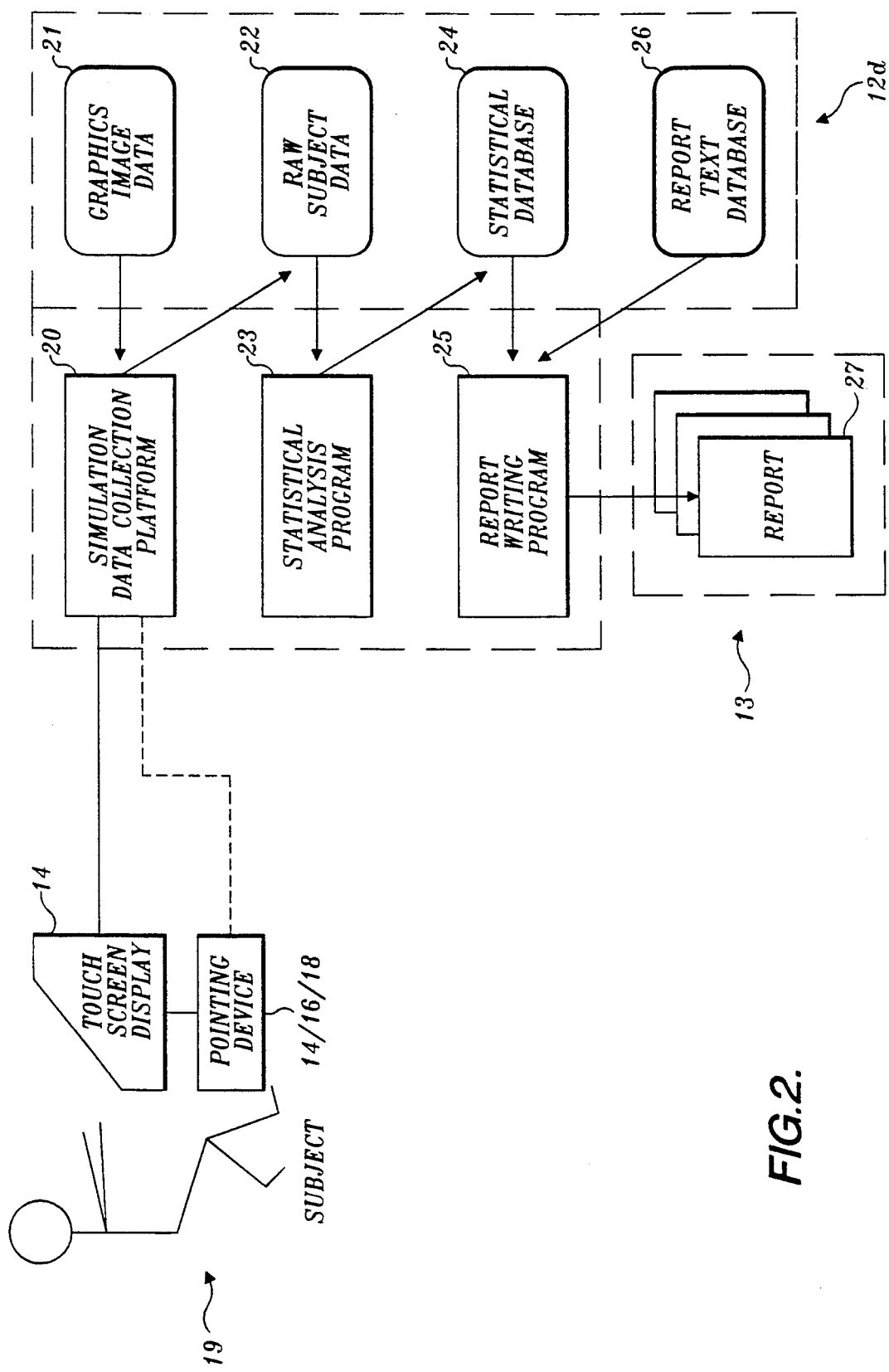
FIG. 2 is a block diagram that relates the functionality of the method comprising the present invention to the computer system of FIG. 1.

In FIG. 2, the functions provided by apparatus 10 are referenced to specific elements of the apparatus shown in FIG. 1. A subject 19, represented by a stick figure, responds to data displayed on touch-sensitive screen display 14 using a pointing device, which may in fact comprise the touch-sensitive screen display and/or the optional mouse 18 (or optional keyboard 16). CPU 12a carries out the assessment, which is divided into three parts, initially functioning as a simulation data collection platform 20 and then running a statistical analysis program 23, and finally, running a report writing program 25. Data that are originally stored on hard drive 12d include graphics image data 21, which are used by the simulation data collection platform (20) in producing specific screen displays and may include text presented in a graphics display mode. In response to input by subject 19, using touch-sensitive screen display 14 (or another data entry/pointing device), simulation data collection platform 20 produces a stream of raw subject data 22, which are stored magnetically on hard drive 12d.

Following completion of the simulated task by subject 19, raw subject data 22 is then input to statistical analysis program 23, which processes the raw subject data, producing a statistical database 24 that includes the data representing input by subject 19 organized into a form enabling it to be used for generating a report of various parameters that define the subject's task-processing style. Report writing program 25 uses statistical database 24 in connection with a report text database 26 to produce a report 27, which is printed on printer 13. A sample of report 27 is discussed below.

A subject's task-processing style is assessed in accordance with the present invention by presenting the individual with a relatively complex but loosely structured task, which is selected so as not to require any specialized skills that might bias the results. As initially explained to subject 19, the only requirements for completing the exercise are that the subject has the ability to: see the touch-sensitive screen display, touch the screen, and read and comprehend the English language. Impliedly, it is also necessary for the subject to finish the exercise to provide meaningful results. The subject is also instructed to continue the exercise until it is completed to his/her satisfaction, or until the time limit is reached. Preferably, the actual exercise requires 90 minutes. Before the exercise begins, the background of the task is explained to the subject and the subject is instructed how to access data that may be important in completing the task and how to provide responses using the touch-sensitive screen display (or other pointer device employed). This initial training period takes about 28 minutes and includes an interval of approximately 10 minutes for familiarization of the subject with each aspect of the exercise and the available resource data. Following a five-minute break, the actual exercise begins. At the completion of the exercise, subject 19 is requested to complete a short questionnaire presented on touch-sensitive screen display 14, which requires approximately five minutes. The questionnaire critiques the exercise, but also develops additional raw subject data for evaluating the subject's task-processing style.

In explaining the background of the simulated task implemented in the preferred embodiment, subject 19 is advised via touch-sensitive screen display 14 that he/she has been appointed to fill a position suddenly and unexpectedly left vacant as a result of the unexplained departure of the Assistant Superintendent of Parks, for the City of Royal Cove, USA. The primary responsibility of the Assistant Superintendent of Parks is to plan and develop parks and recreation facilities. The subject is also advised that the City of Royal Cove has undertaken a large and important project, the building of a new zoological garden. As Chairman of the Zoo Steering Committee, the Assistant Superintendent of Parks is responsible for developing the preliminary layout of the new zoo, which will provide a guide for architects. The preliminary layout must be completed by a scheduled 1:00 p.m. meeting with the architects. In addition, as a City Council Member, this fictitious person represents the City residents regarding the governing of Royal Cove. There are environmental, political, economic, and other concerns involved in designing the zoo.

The subject is then advised that it is now 9:00 a.m. on the morning of the subject's first day on this new job, and that the subject is seated at the desk of the former Assistant Superintendent of Parks, ready to assume the responsibilities of that position. The subject is informed: "Your task is to take over and do whatever you feel needs to be done to meet the demands of the job." It should thus be apparent that the task defined by these instructions to the subject is very loosely structured, thereby giving the subject considerable latitude in carrying out the responsibilities of the position in completing the simulated task.

As noted above, during the preliminarily instructional period, subject 19 is instructed on how to use touch-sensitive screen display 14 in accessing data necessary to carry out the responsibilities of the job, and in providing input data as may appear appropriate. "Buttons" and icons that appear on touch-sensitive screen display 14 are labeled or graphically represent their function, and their use is clearly explained during this training period, which progresses as subject 19 touches a portion of the screen to indicate that each phase of the instructions are understood and to continue with the training period. The subject is also advised that the information presented during the training period will be available during the actual exercise, but is not allowed to back up to view instructions previously presented.

Each type of data that may be useful in carrying out the responsibilities of the simulated task is introduced to the subject during the training period, and portions of the data are briefly presented, by way of example, to ensure that subject 19 is completely familiar with use of touch-sensitive screen display 14 and understands how to use the touch-sensitive screen to access each type of data. During the familiarization period, the subject is allowed to freely access the input data, while practicing with the touch-sensitive screen display and becoming familiar with the types of data and the actual content thereof. By the time the familiarization period is completed, subject 19 is typically quite confident and competent in using the touch-sensitive screen display and in accessing data that may be useful in carrying out the simulated task.

Figure 3:
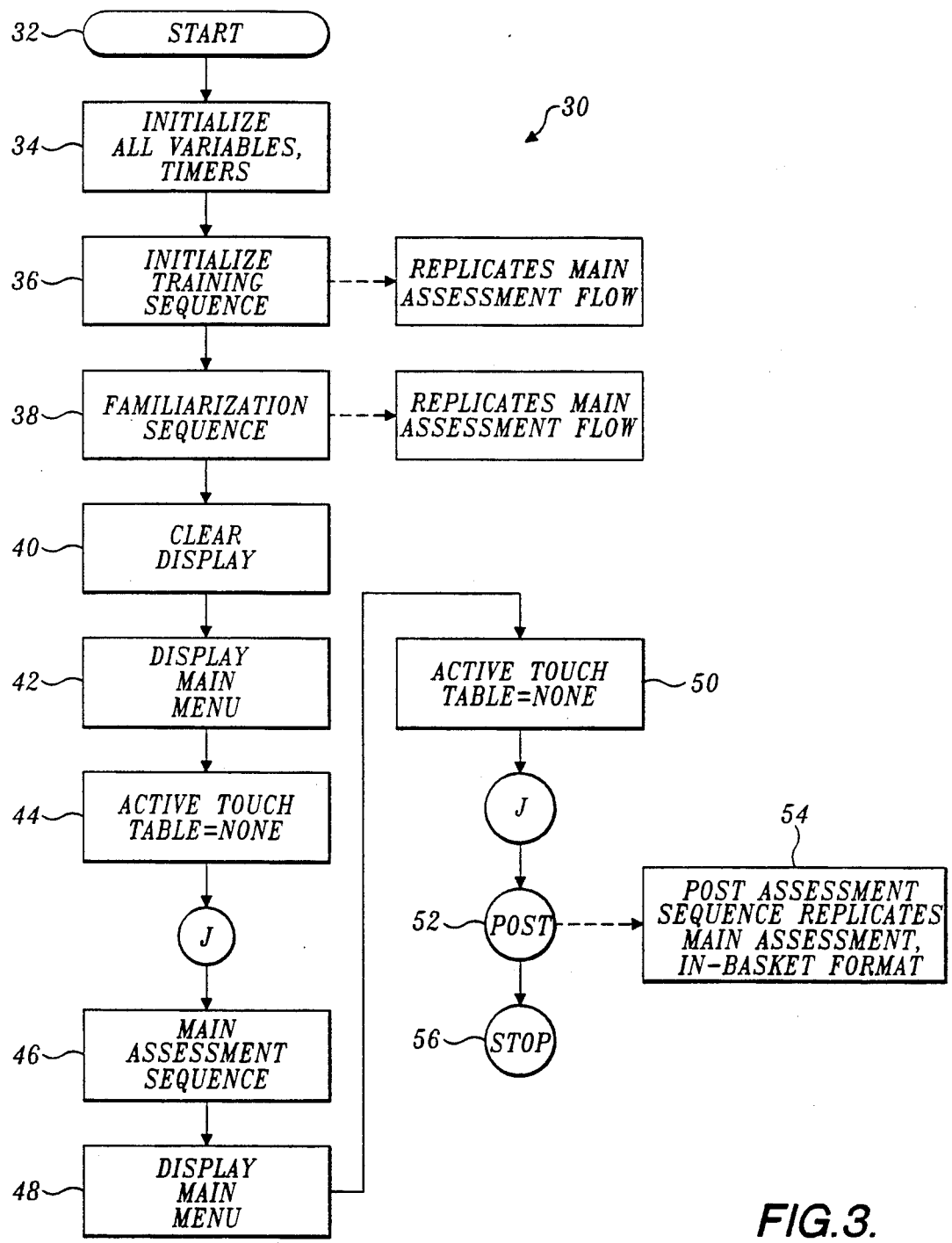
FIG. 3 is a flow chart generally showing the steps implemented in assessing an individual's task-processing style.

Turning now to FIG. 3, a flow chart 30 illustrates the logic steps generally implemented in assessing the task-processing style of subject 19. Flow chart 30 begins at a start block 32. A block 34 initializes all variables timers. As explained above, the subject undergoes an initial training sequence, which begins in a block 36. Since details of the training sequence for the most part replicate various aspects of the actual task-processing style assessment exercise, they are not included herein. The initial training sequence in block 36 is followed by the initiation of a familiarization sequence in a block 38, wherein subject 19 is given an opportunity to practice using touch-sensitive screen display 14 to access the data available to the subject for carrying out the simulated task. After a block 38 sets a familiarization flag to "yes," a block 40 clears the display left from the initial training sequence, and a block 42 displays a main menu (explained in greater detail below). Since the familiarization sequence has just begun, a block 44 sets an active touch table associated with the screen presented to "none," indicating that subject 19 has not yet selected one of the icons on the main menu and that a touch table need not be associated with the screen at this time. Thereafter, a flow chart 30 calls up a subroutine "J." In subroutine J, which is discussed in greater detail below, the program responds to the subject's selection of one of the main menu items; this selection may lead to further branching of the program, but, in any case, the selection remains a part of the familiarization sequence.

After the subject has completed the initial training and has had an opportunity to become familiar with the touch-sensitive screen display and the available data during the 10-minute familiarization period, a block 46 starts the main assessment sequence 9 setting the familiarization flag to "no." A block 48 redisplays the main menu, and a block 50 again sets the active touch table to none. Subroutine J is called once more, and the main assessment sequence continues. As was the case for subroutine J in the familiarization period, the program responds to the subject's selection of one of the main menu items, which may lead to further branching of the program. During the main assessment sequence, subject 19 accesses the available data and processes the simulated task for the allotted 90-minute time period. It should be apparent that block 38 and block 46 represent many-tiered branching trees, which are unique to each individual undergoing the task-solving style assessment. Accordingly, it is meaningless to attempt to track each step occurring sequentially in either the familiarization period or the main assessment, since each individual makes decisions during the task-processing style assessment that are substantially different from other individuals. At the end of the 90-minute main assessment interval, a post-assessment sequence that replicates a portion of the main assessment sequence is initiated at a block 52. Following the post-assessment sequence, the program terminates at a block 56.

A report writing program is initiated after completion of the main assessment interval, as previously discussed with regard to FIG. 2.

Figure 4A:
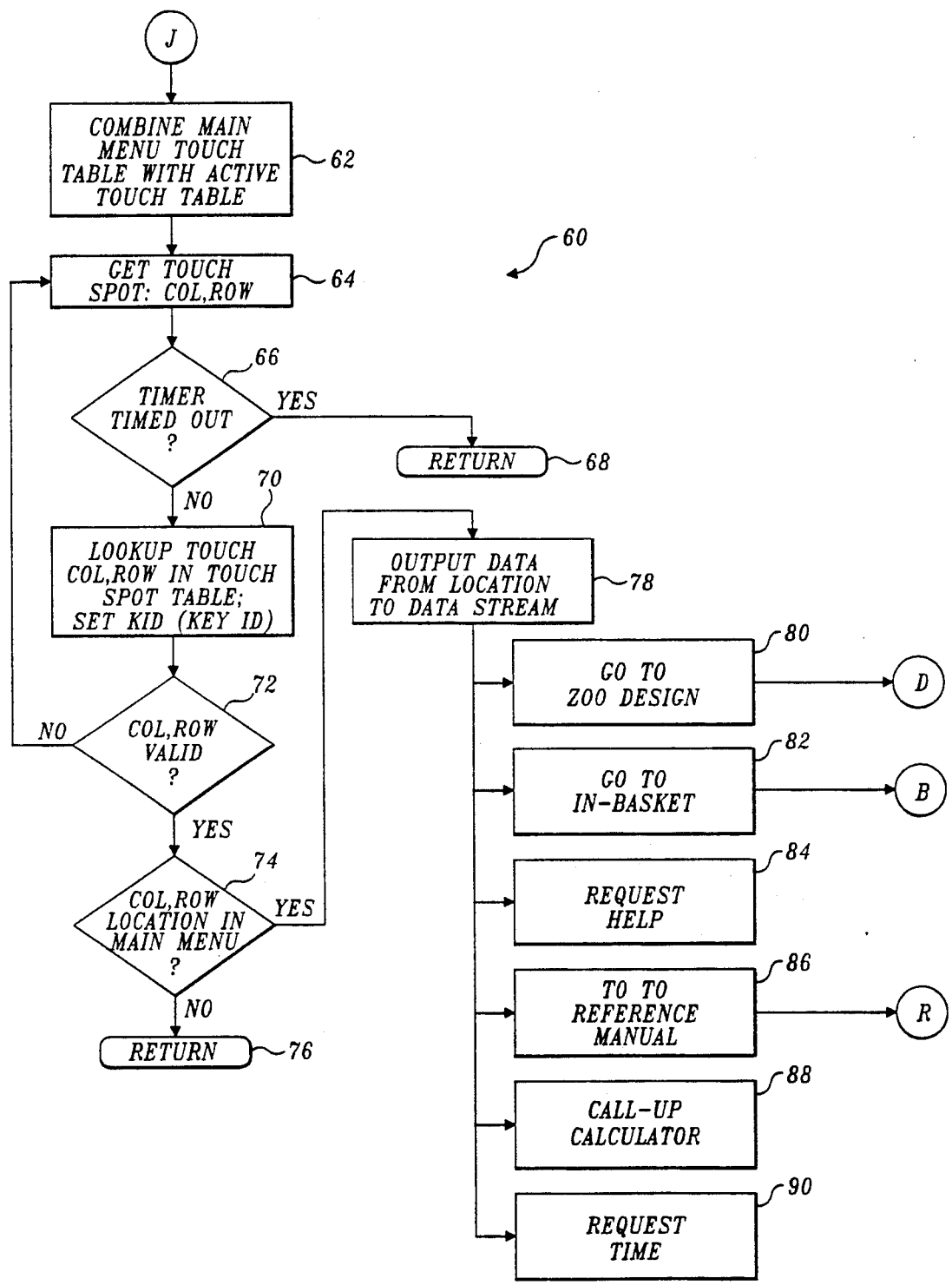
FIG. 4A is a flow chart of an input subroutine and shows the steps for intercepting input resulting by the subject touching portions of a main menu or other touch-sensitive regions of a touch-sensitive display screen.
Figure 4B:
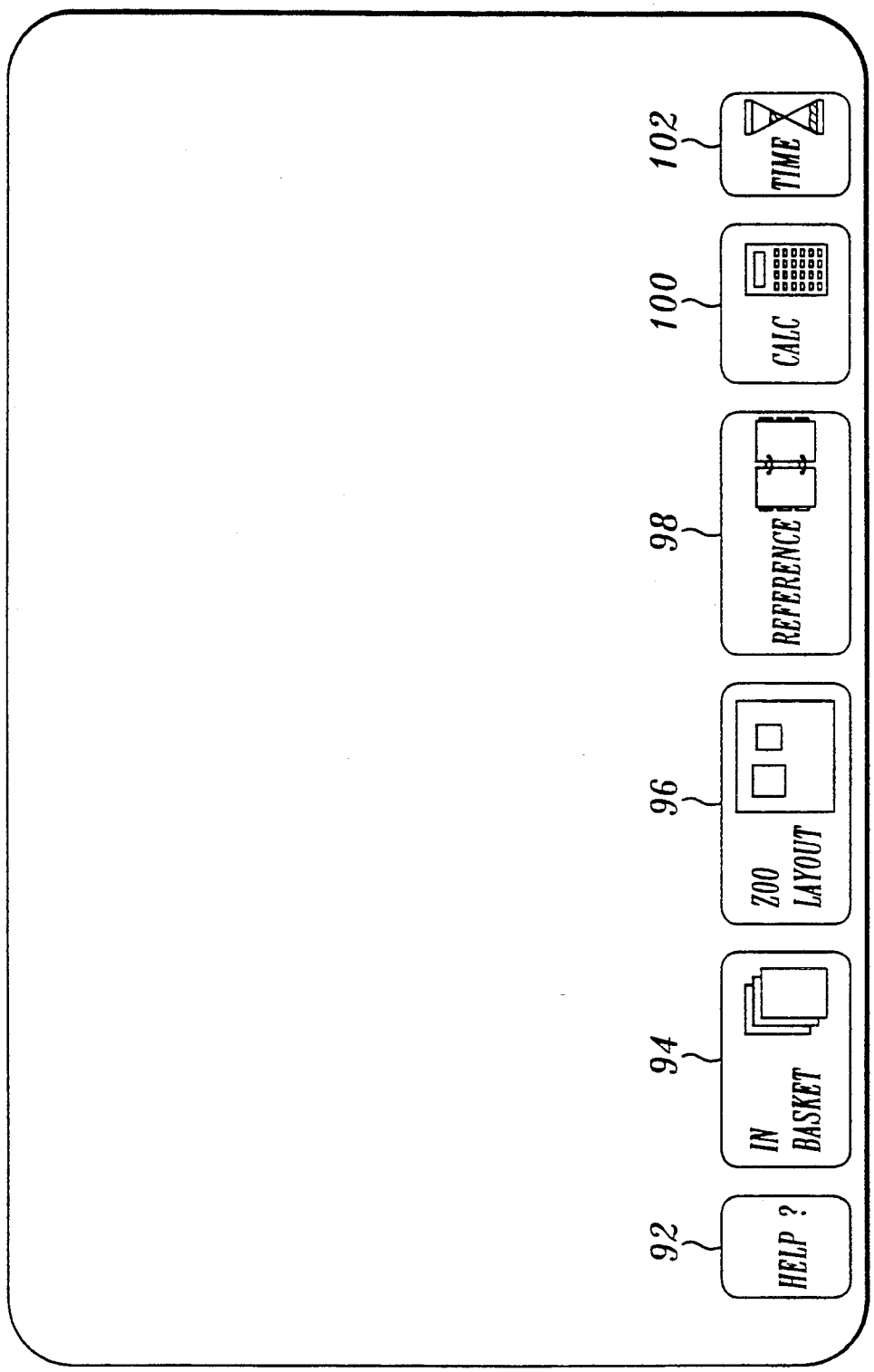
FIG. 4B shows the screen display for the main menu.

Referring back to block 44, after the active touch table is initialized, subroutine J is called, as shown in FIG. 4A. A flow chart 60 illustrates the steps carried out in subroutine J, starting at a block 62, which combines the main menu touch table (shown in FIG. 4B) with the active touch table. Since the active touch table is initially equal to "none," block 62 simply shows the main menu on touch-sensitive screen display 14, as indicated in FIG. 4B. The main menu comprises a plurality of touch-sensitive regions on the screen that represent control buttons, including a Help button 92, an In-basket button 94, a Zoo layout button 96, a Reference button 98, a Calculator button 100, and a Time button 102. The purpose of each of the main menu control buttons is explained below.

In a block 64, CPU 12a is instructed to get the touch spot on the screen, i.e. the coordinates of the portion of touch-sensitive screen display 14 touched by subject 19 and to return a column and row for that spot in a block 64. Thereafter, a decision block 66 determines if a timer for the exercise has timed out, and if so, a return block 68 provides for returning to the calling program (or subroutine). The timer referenced in decision block 66 is set for 90 minutes by block 46 for the actual exercise and thus represents the time allotted for the subject to complete the exercise. During the familiarization period, the timer is set for 10 minutes by block 38; other time intervals are used for other portions of the total time the subject is using computer 12. If the timer has not timed out, a block 70 refers to a look up touch spot table using the column and row at which the subject touched the touch-sensitive screen display and in response returns a key identification (KID) for the region touched. If the KID is valid, i.e. if it represents one of the optional control buttons in the main menu or other active touch regions displayed on the screen, the logic proceeds with a decision block 74. Otherwise, the logic returns to block 64 to look for a different input from the user, since the user may simply be sliding the pointer used to touch the spot on the screen toward the desired control button or region to be selected.

Decision block 74 determines if the column and row of the location touched represent control buttons in the main menu and if not, returns to the calling program. Alternatively, if the region touched by the subject represents one of the control buttons comprising the main menu, a block 78 outputs the corresponding KID as a data stream of raw subject data that is stored on hard drive 12d. (The output of this data stream is handled by a subroutine "P", as explained below.)

Following block 78, in response to subject 19 touching one of the control buttons in the main menu, the program proceeds to one of six different subroutines, represented by blocks 80 through 90. These blocks include: the Zoo design (in block 80, calling a subroutine "D"), the In-basket (in a block 82, calling a subroutine "B"), a request for Help (in a block 84), the Reference Manual (in a block 86, calling a subroutine "R"), a Calculator (in a block 88), and a request for the Time remaining to complete the exercise (in a block 90). Details of the Help screen called in block 84, the Calculator called in block 88, and the request for Time called in block 90 are not included herein. While the subject's access of the Help screen, Calculator, and Time are used in evaluating task-solving style, these items function much the same as one would expect and the access made of them by the subject is recorded in much the same way as the access of other main menu items.

Although one aspect of the task set forth for the subject is to develop a zoo design for use by the architects, a collateral responsibility of the simulated position being assumed by the subject is to respond to memos that have accumulated in the In-basket of the predecessor Assistant Superintendent of Parks. Data concerning the zoo design project is also included within the memos. Upon viewing the memos in the In-basket, the subject may decide that at least some of the memos require an appropriate response. Accordingly, many subjects start the exercise by reviewing the memos in the In-basket with a selecting control button 94 on the main menu at the bottom of the screen.

Figure 5A:
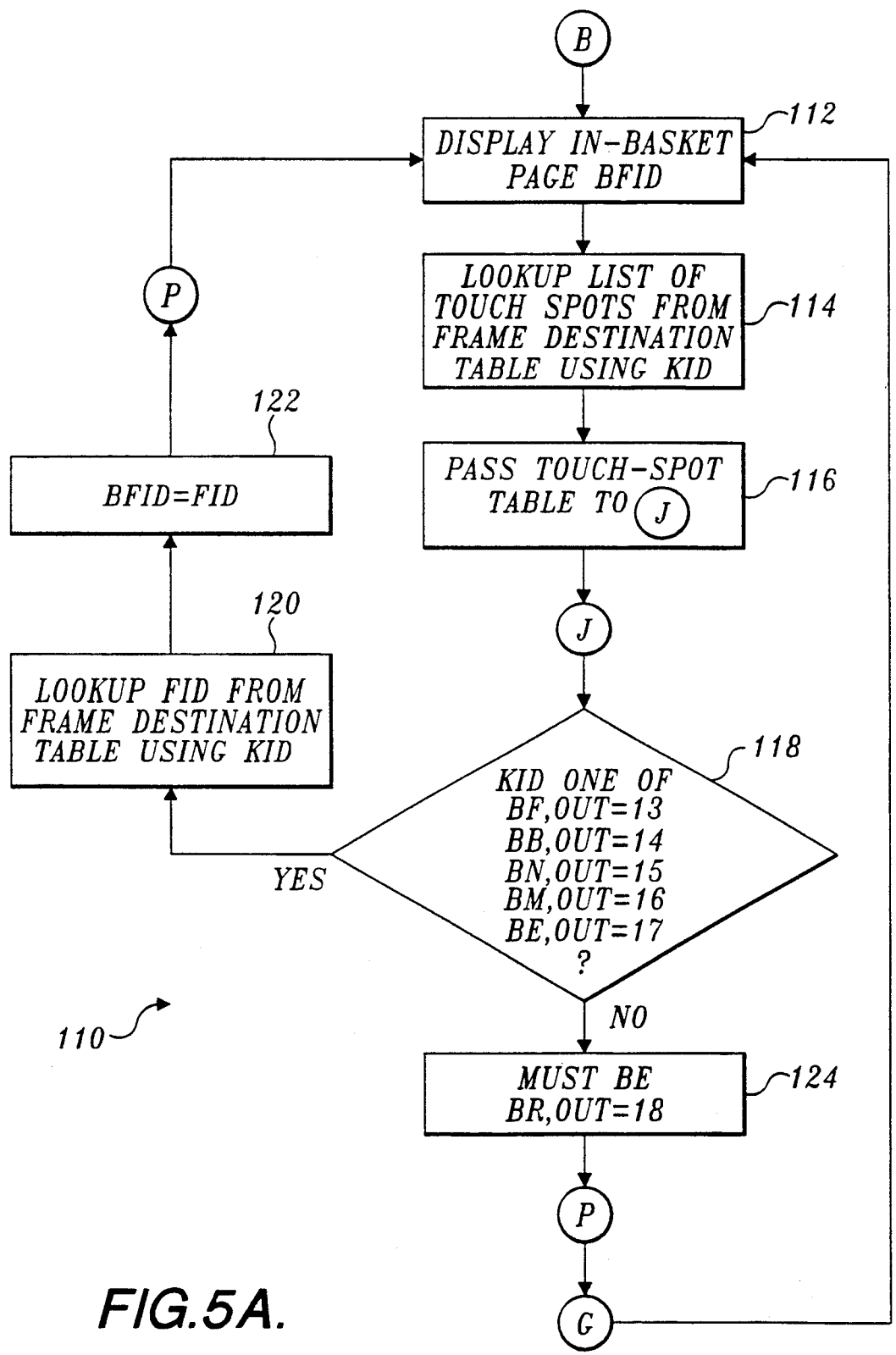
FIG. 5A is a flow chart illustrating a subroutine used to process choices by the subject relating to an "In-basket," which is one of the sources of data for resolving the task.

With reference to FIG. 5A, a flow chart 110 showing the logic steps implemented when subject 19 selects the In-basket from the main menu begins with a block 112, which instructs CPU 12a to display the next In-basket page (initially, the first memo in the In-basket) and determine the In-basket Frame Identifier (BFID) associated with it. A block 114 instructs the CPU to look up a list of touch spots for the In-basket screen from a Frame Designation Table stored in ROM 12b using the KID (the identification for In-basket control button). A block 116 then passes the touch spot table for the In-basket to subroutine J, to enable user selection of the various touch spots in each In-basket screen display. The In-basket touch table is as follows:

| KID | Description         | Col | Row | Wide | Deep |
|-----|---------------------|-----|-----|------|------|
| BN  | Next In-basket      | 579 | 062 | 030  | 012  |
| BM  | Middle In-basket    | 562 | 032 | 030  | 012  |
| BE  | End In-basket       | 551 | 007 | 030  | 012  |
| BF  | Next In-basket Page | 593 | 196 | 023  | 082  |
| BB  | Prev. In-basket Page| 593 | 104 | 023  | 085  |
| BR  | My Response is . . .| 006 | 227 | 073  | 055  |

Figure 5B:
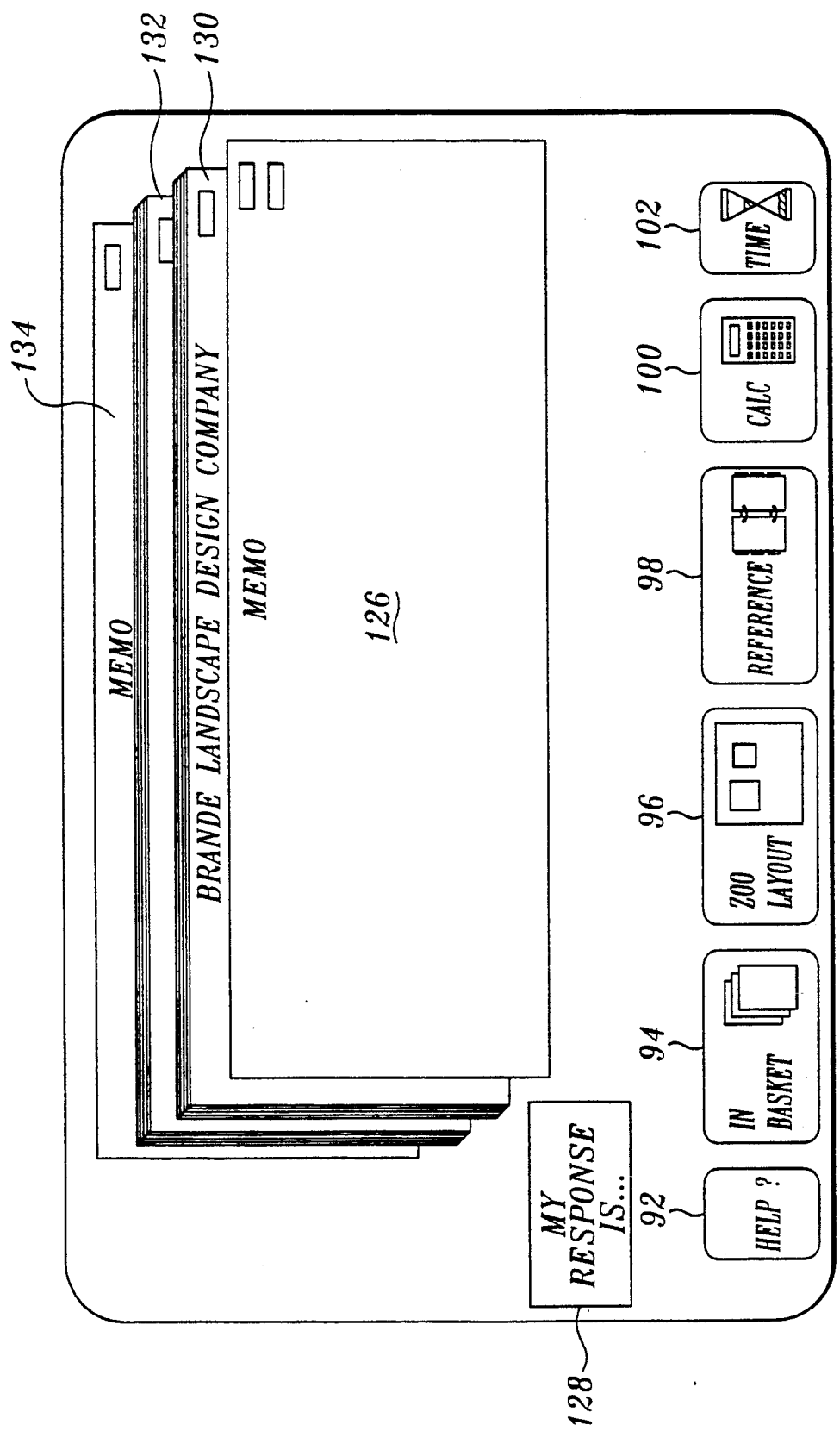
FIG. 5B is a screen display illustrating the presentation of memos in the In-basket.

An example of the In-basket screen display is shown in FIG. 5B. On top of a stack of four memos appears a memo 126, corresponding to the next In-basket page displayed, in accordance with block 112. Memo 126 is followed by a next In-basket memo 130 having a KID equal to BN, followed by a middle In-basket memo 132 with a KID designation BM, and finally, an end In-basket memo 134 with a KID designation BE. Each of the underlying memos 130 through 134 can be selectively called to the top of the stack by subject 19 touching the upper right corner of the memo. As each successive memo is called up to the top of the stack, new memos in the In-basket are added on the bottom of the stack. A memo such as next In-basket memo 130, which has multiple pages, includes a region on the right side of the page (not shown) that can be touched by the subject to access the next page of the memo (KID equal to BF). Similarly, an additional region (not shown) is provided on subsequent pages of a multi-page memo for accessing the previous page (KID equal to BB). The subject can thus access all pages of a total of 20 memos in the In-basket. At any point during the exercise, the subject may respond to any memo on top of the displayed stack by selecting a touch-sensitive block 128, having a KID equal to BR. The selection of memos, and other options on the touch-sensitive screen shown in FIG. 5B is handled by subroutine J, as previously explained.

When subroutine J returns to flow chart 110, it provides a value OUT corresponding to the specific one of the KID options BF, BB, BN, BM, BE, and BR that was selected. For the first five of these options, the values for OUT are respectively 13-17, as shown in a block 118 in flow chart 110. Assuming that subject 19 has selected one of the memos in the In-basket (rather than selecting to respond to one of the memos), the flow chart proceeds from decision block 118 to a block 120, which provides for looking up the FID from the frame destination table using the KID of the touch region selected by the subject. In other words, depending upon which touch-sensitive region of the memos displayed on the screen shown in FIG. 5B has been selected by the subject during subroutine J, an appropriate FID corresponding to that selection is provided in block 120 to enable the screen display to be updated. A block 122 then sets the In-basket BFID to that selected FID and calls a subroutine P. Subroutine P, as explained below, is used for producing the raw subject data based upon touch-sensitive screen display selections made by the subject, for later analysis in defining the subject's task-processing style.

Alternatively, if the subject has not selected one of the five options presented in decision block 118, it follows that the subject has elected to respond to the memo that is on top of the stack. A block 124 indicates that the subject's choice corresponds to selecting touch-sensitive region 128 on the screen display shown in FIG. 5B. Accordingly, the value of OUT is set equal to 18. Thereafter, subroutine P is called to record the subject's decision to respond to a memo as raw subject data.

Figure 9:
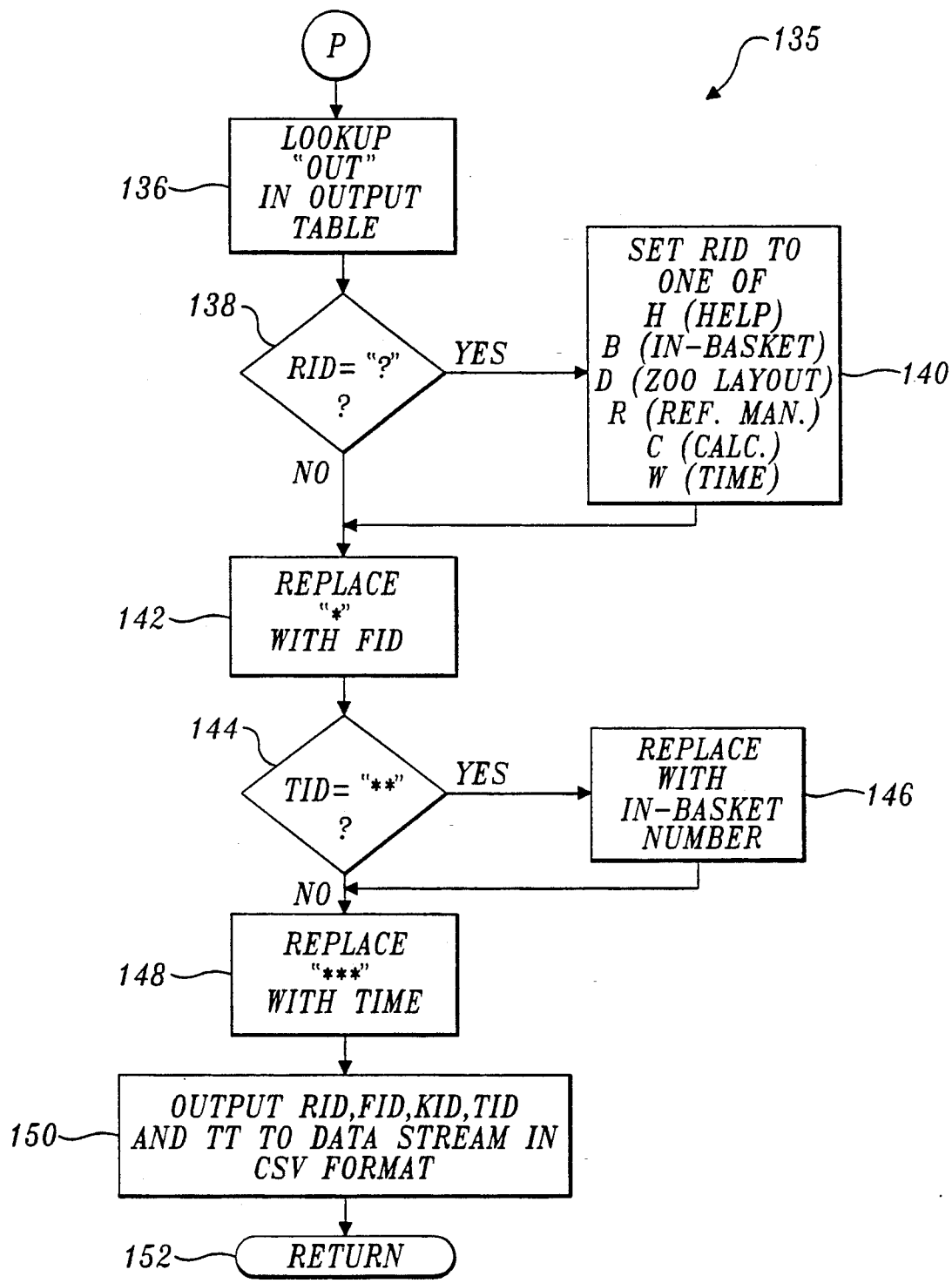
FIG. 9 is a flow chart of an output subroutine that provides a data stream of raw subject data used to analyze the individual's task-processing style.

Details of subroutine P are shown in a flow chart 135 within FIG. 9. Flow chart 135 begins at a block 136, which provides for looking up the value assigned to OUT corresponding to the KID of the selected region on the screen display in an output table. An example of a portion of an output table is as follows:

| OUT | RID | FID | KID | TID | TT  | DESCRIPTION |
|-----|-----|-----|-----|-----|-----|-------------|
| 12  | ?   | *   | B   | n   | *** | In-Basket   |
| 13  | B   | *   | BF  | n   | *** | In-Basket - Next Page |
| 14  | B   | *   | BB  | n   | *** | In-Basket - Prev. Page |
| 15  | B   | *   | BN  | n   | *** | In-Basket - Next Memo |
| 16  | B   | *   | BM  | n   | *** | In-Basket - Middle Memo |
| 17  | B   | *   | BE  | n   | *** | In-Basket - Prev. Memo |
| 18  | B   | *   | BR  | n   | *** | In-Basket - My Response Is . . . |
| 19  | B   | *   | BA  | **  | *** | In-Basket - Accept Response Grid Option |
| 20  | B   | *   | BC  | **  | *** | In-Basket - Cancel Response Grip Option |
| 21  | B   | *   | BBb | **  | *** | In-Basket - Return to Memo |
| 22  | B   | *   | B1  | **  | *** | In-Basket - Response Grid Option 1 |
| 23  | B   | *   | B2  | **  | *** | In-Basket - Response Grid Option 2 |

The output table provides a corresponding value for the raw data identification (RID), based upon the value for OUT. The value RID is set equal to "?" if the subject has selected one of the five main menu options 92-102 at the bottom of the screen display. For all other options involving the In-basket, RID is set equal to B. Accordingly, a decision block 138 responds to the value of RID, equals "?," a block 140 sets the value of RID to one of H, B, D, R, C, or W, each corresponding to one of the main menu items that was selected by the subject. Thereafter, or assuming that RID does not equal "?," a block 142 replaces a "*" that was associated with the selected value of OUT in the output table with the current value of FID for the current frame shown on the screen display. The output table also assigns a value for table identification (TID), which corresponds to a decision by the subject to respond to a memo and is equal to "." Accordingly, a decision block 144 determines if TID equals "," and if it does, a block 146 replaces the TID value with an In-basket memo number. Thereafter, or following a negative response to decision block 144, a block 148 replaces a value for the touch time (TT), which in the output table is initially assigned "***" with the current time at which the subject made the selection that resulted in subroutine P being called. A block 150 then stores the values of RID, FID, KID, TID, and TT as comma separated values (CSV) comprising raw subject data, on hard drive 12d. An example of the data stream comprising the raw subject data is as follows:

| RID | RID | KID | TID | TT |
|-----|-----|-----|-----|--------|
| B   | B16 | BE  |     | 234.29 |
| B   | B15 | BN  |     | 238.28 |
| B   | B16 | BN  |     | 240.19 |
| B   | B17 | BR  |     | 241.32 |
| B   | AR  | B13 | 17  | 241.80 |
| B   | AR  | B14 | 17  | 247.78 |
| B   | AR  | B15 | 17  | 250.38 |
| B   | AR  | B16 | 17  | 255.63 |
| B   | AR  | BA  | 17  | 256.52 |

A block 152 returns from subroutine P to the calling program.

It should be helpful to review an example of the type of information presented to subject 19 in memos 1 through 20, for the preferred embodiment. In the fourth memo, having an FID equal to B4, the Recycling Coordinator for Royal Cove has written a note to the Zoo Steering Committee, which reads as follows:

> I thought it best to try to nip what could be an environmental problem in the bud. I refer, of course, to the use of Styrofoam TM cups (or anything, for that matter, that can be replaced by objects made of recyclable material) at such places as concessions stands. Perhaps visitors to the zoo might find a small educational exhibit focusing on how recycling helps the environment. It's just a thought, and even if one person began taking their empty soda cans to the city's recycling center, the exhibit would have been worth it. Thank you for your time.

Assuming that subject 19 chooses to respond to the above memo, touch-sensitive region 128 shown in FIG. 5B would be selected, causing subroutine P to be called to record the selection in the raw subject data. Thereafter, a subroutine G is called to enable the subject to select an appropriate response from among 16 possible responses presented as an array of touch-sensitive regions.

Figure 6A:
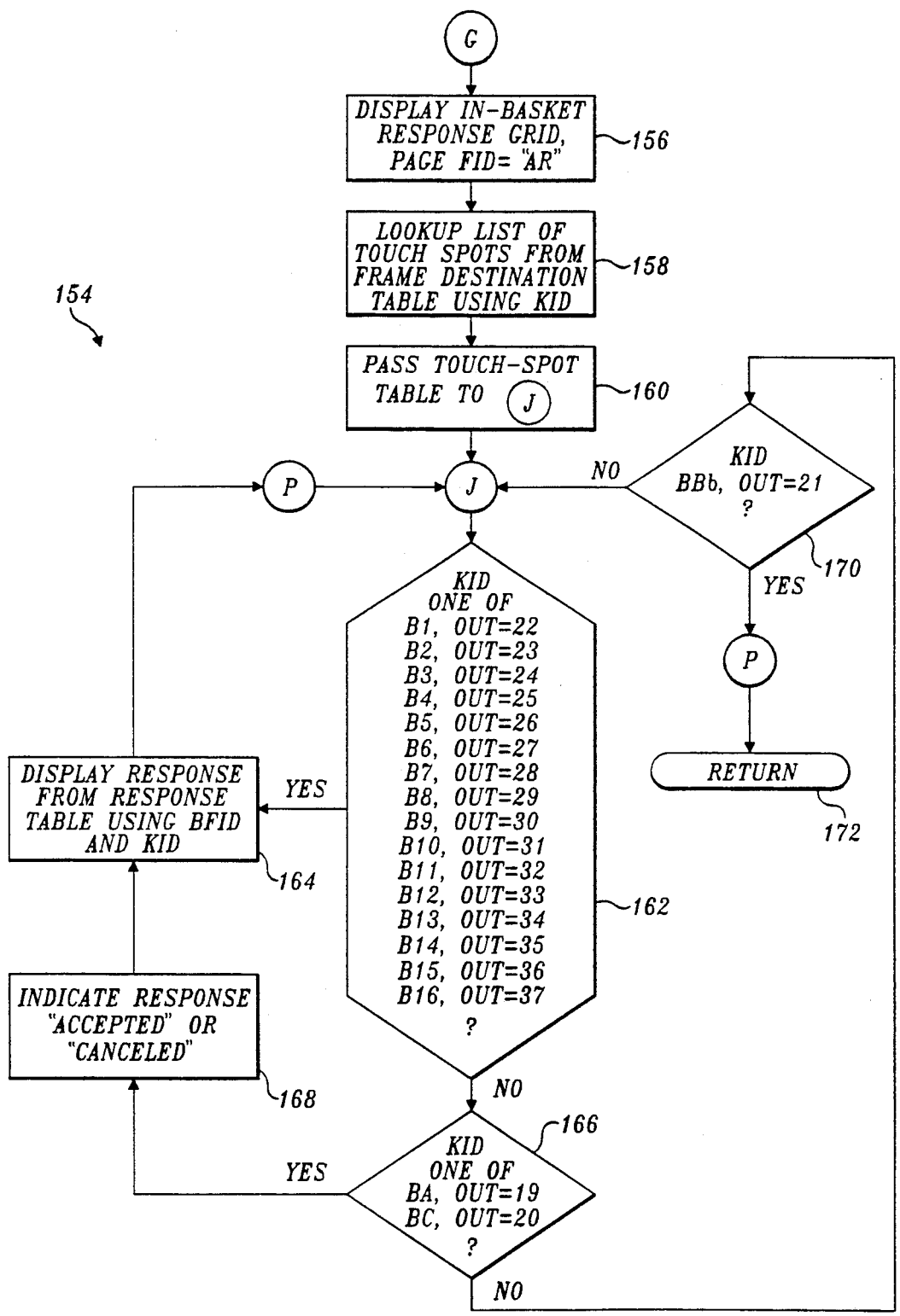
FIG. 6A is a flow chart of a subroutine that handles an In-basket response grid.
Figure 6B:
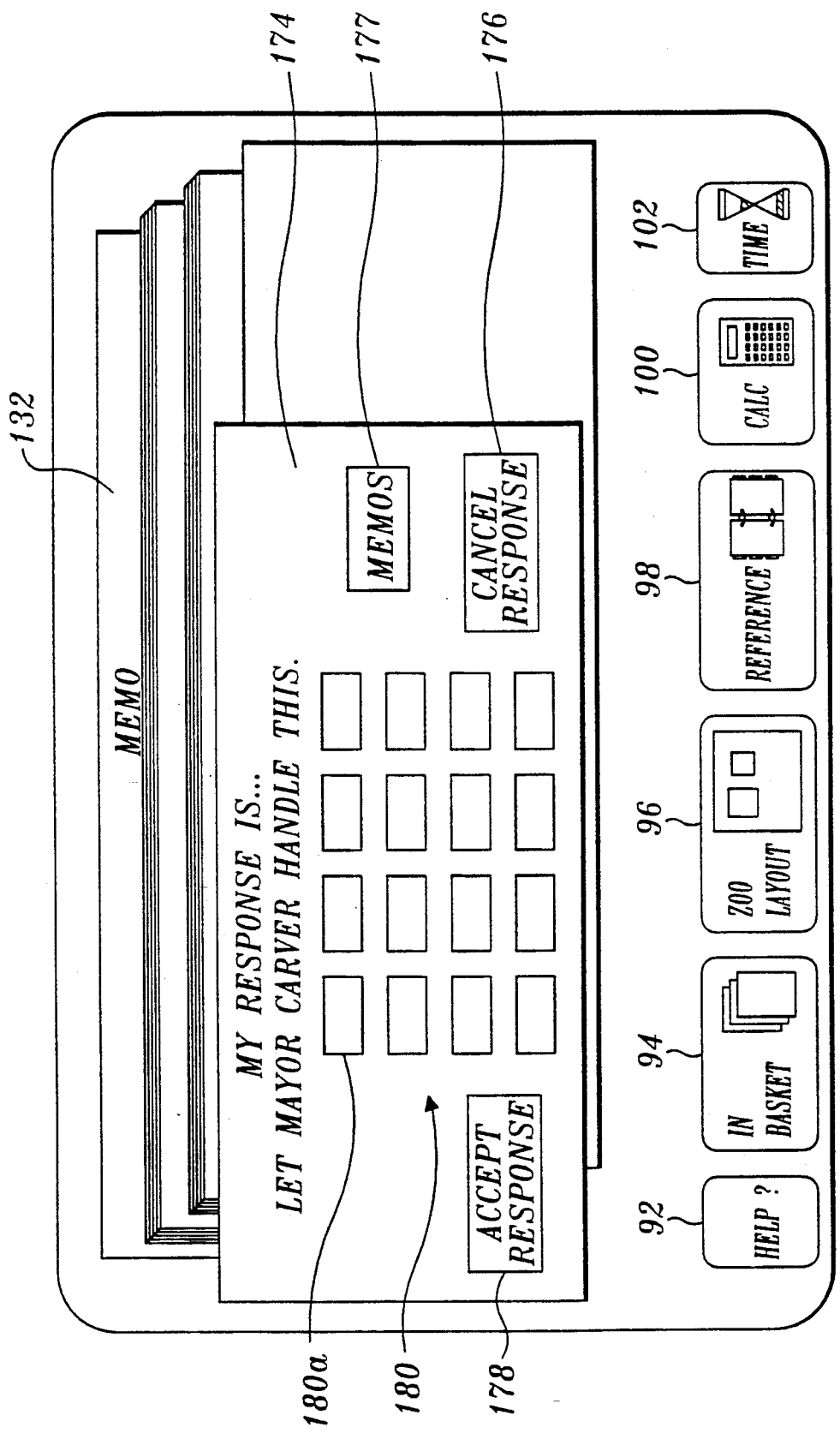
FIG. 6B is an exemplary screen display showing the In-basket response grid.

Subroutine G is shown in FIG. 6A, and an example of the screen displayed to the subject to enable selection from among 16 possible responses to the memo is shown in FIG. 6B. The steps comprising subroutine G are presented in a flow chart 154, which starts with a block 156 that provides for displaying an In-basket response grid 174, as shown in FIG. 6B. In block 156, a page BFID is set equal to "AR" indicating that the In-basket frame identification corresponds to an array of responses. A block 158 instructs CPU 12a to look up a list of touch-sensitive spots for the frame having an FID equal to B4 from the In-basket response table using the KID (BR) associated with this display returned by subroutine J (shown in FIG. 5A). Thereafter, a block 160 passes the touch spot table to subroutine J, enabling the subject to select from among the touch-sensitive regions of the screen displayed at that time. Response grid 174 includes a 4×4 array 180 of touch-sensitive regions, each corresponding to a possible response to the memo previously viewed by the subject before electing to respond to it. By touching each of the touch-sensitive regions comprising array 180, subject 19 causes the associated suggested response corresponding to that element of the array to be displayed within response grid 174, as shown in FIG. 6B.

For example, if the subject touches a touch-sensitive region 180a in the upper left corner of array 180, the suggested response "Let Mayor Carver handle this" is displayed. A touch-sensitive region 176 can be selected to Cancel the response, or a touch-sensitive region 178 can be selected to Accept it. If the subject wants to select another of the other touch-sensitive regions comprising array 180, the "Cancel Response" region is first selected, and the next element is touched so that the suggested response corresponding to that element is displayed, replacing the previously displayed response. Each time a touch region is selected, subroutine J is called to enable the subject to make a selection. A decision block 162 determines the touch-sensitive area of the display that the subject has selected during the running of subroutine J, based upon the value of OUT returned by subroutine J. Decision block 162 determines if the subject elected one of the elements B1 through B16 of array 180, each element having a corresponding value of OUT. If the response to this decision block is affirmative, a block 164 displays the response associated with the selected region of the array from a response table, identifying it using the BFID and KID values existent at that time. Subroutine P is then called, as explained above, to provide for output of the raw subject data, including the time of the selection and other parameters associated with the selection. After returning from subroutine P, subroutine J is again called, enabling further selections by the subject.

Possible responses from the In-basket response table to the memo quoted above are:

| | |
|---|---|
| B1  | Let Mayor Carver handle this. |
| B2  | Contact Brigitte for more information. |
| B3  | Write a letter stating that the issue is being considered and a response is forthcoming |
| B4  | I'll decide what to do with this later. |
| B5  | I'll talk over the problem with Lee. |
| B6  | Tell Heather to respond to this. |
| B7  | Bracebridge can handle this. |
| B8  | I'm not the person to handle this. |
| B9  | I should find out what public sentiment is about recycling, before I respond to this. |
| B10 | It's not clear to me what I should do with this. |
| B11 | I would do something very different from any of the choices offered. |
| B12 | None of these choices. |
| B13 | Tell Brigitte to organize an exhibit. |
| B14 | Tell Brigitte that Styrofoam TM cups really are more cost effective than recycled products. |
| B15 | Tell Brigitte that there aren't any recyclable products that hold hot food well. |
| B16 | I would consider this when choosing a vender for concessions. |

Assuming a negative response to decision block 162, a decision block 166 determines if the value of KID returned by subroutine J is equal to BA, indicating that the subject has selected touch-sensitive region 178 to Accept the Response, or BC, indicating that the subject has elected to Cancel the Response by touching region 176, each of these values having a corresponding value of OUT. An affirmative response to decision block 166 leads to a block 168, which indicates on the screen display that the response is "Accepted" or "Cancelled", as appropriate. The logic then proceeds again through block 164 as previously explained.

A negative response to decision block 166 leads to a decision block 170, which determines if the KID returned by subroutine J has a value of BBb, indicating that the subject has elected a touch-sensitive region 177 that represents an icon showing the In-basket, and setting OUT equal to 21. An affirmative response to decision block 170 again leads to subroutine P being called to record the decision by the subject, and thereafter, an exit from subroutine G at a return block 172. A negative response to decision block 170 results in subroutine J being called again, to accept further input from the subject.

After the subject has viewed, and perhaps responded to, some of the 20 memos provided in the In-basket, the subject may elect to design the zoo layout, by selecting touch-sensitive control button 96 in the main menu, or to view additional data presented in the Reference Manual, by touching touch-sensitive control button 98 in the main menu. As shown in FIG. 4A, selection of the Reference Manual at a block 86, results in subroutine R being called by CPU 12a.

Figure 8A:
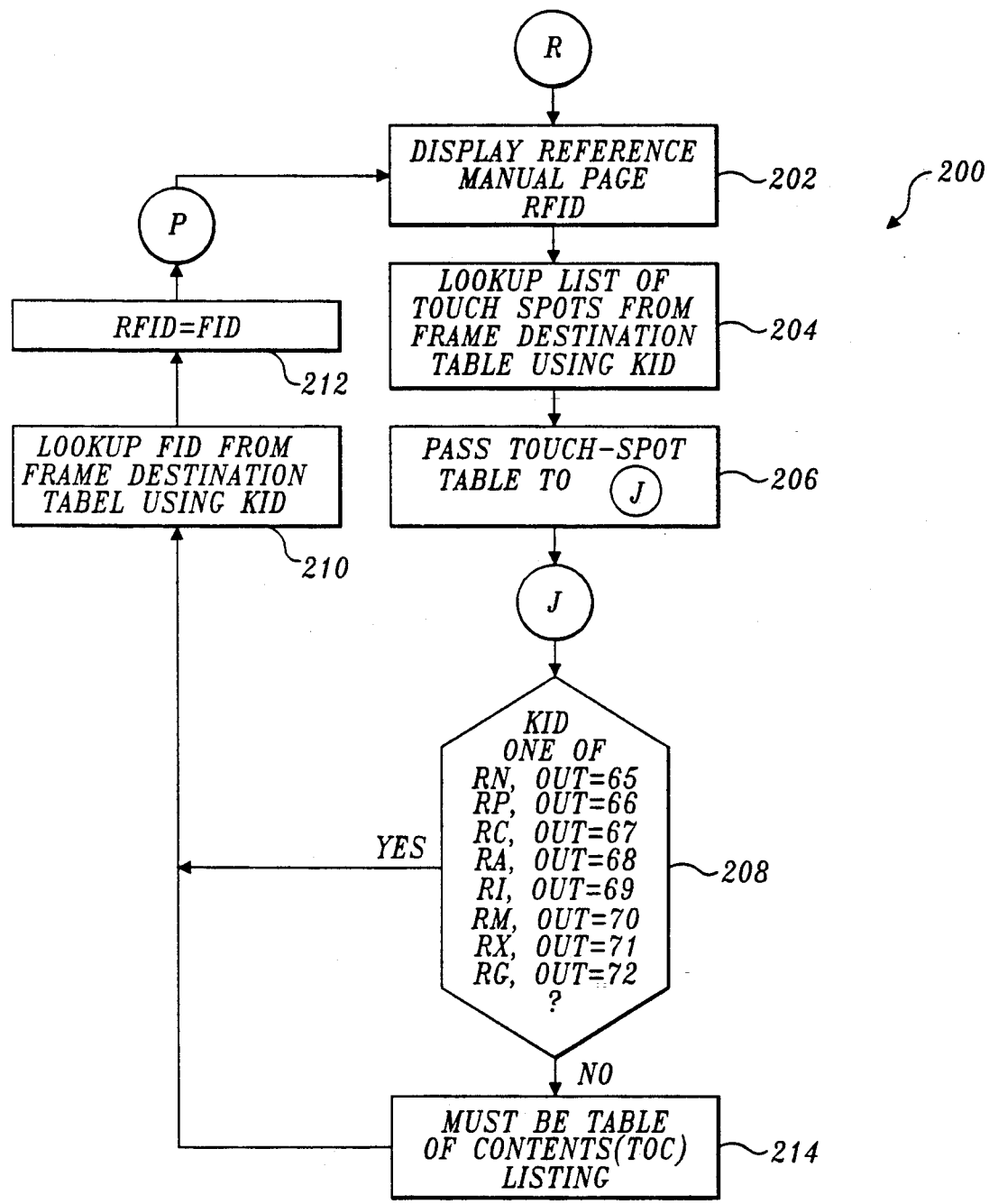
FIG. 8A is a flow chart showing the subroutine for accessing input data in a Reference Manual.
Figure 8B:
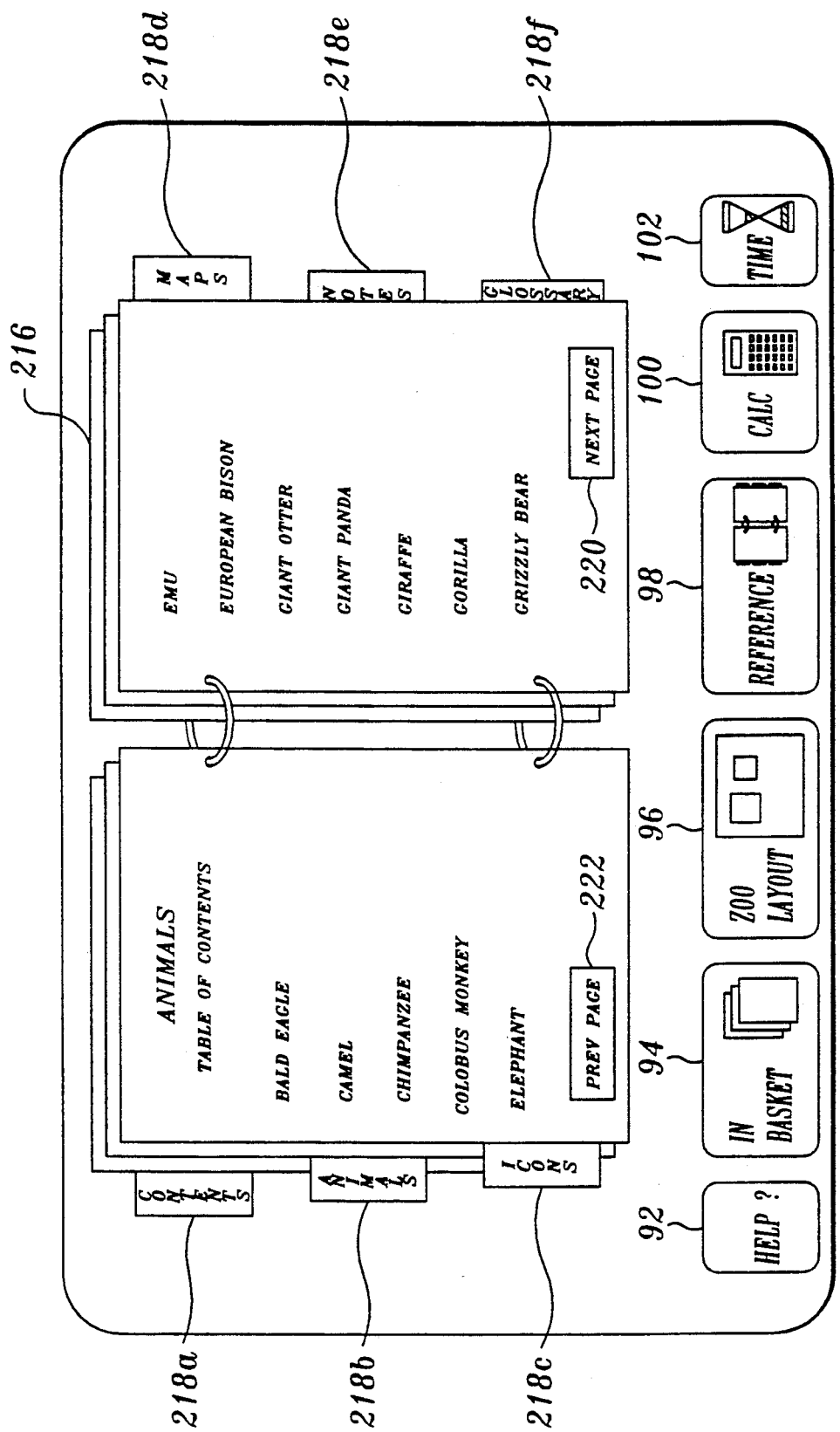
FIG. 8B is an exemplary screen display showing two of the pages in a Table Of Contents entry in the Reference Manual.

A flow chart 200 illustrates the steps performed in carrying out subroutine R, shown in FIG. 8A, and FIG. 8B provides an example of one of the screen displays accessed by a subject when the Reference Manual is selected. In a block 202, a first step in flow chart 200 displays a Reference Manual page corresponding to a Reference Manual frame identification (RFID). For example, as shown in FIG. 8B, a Reference Manual page display 216 shows the Table of Contents under the section corresponding to Animals, and lists a number of animals that might be considered for inclusion in the zoo. Each screen display in the Reference Manual has a corresponding RFID associated with it. A plurality of tabs 218, including tabs 218a through 218f, are each associated with different subjects contained within the Reference Manual that can be directly accessed by the subject touching the tab portion on the screen display. Alternatively, a Next Page touch-sensitive region 220 and a Previous Page touch-sensitive region 222 are provided to enable the subject to thumb through the Reference Manual page by page in either direction. At the bottom of the display are the main menu control buttons, as discussed above.

Referring back to FIG. 8A, a block 204 instructs CPU 12a to look up a list of touch regions for the Reference Manual, using its KID value. A block 206 passes the touch-sensitive spots to subroutine J, enabling the user to select a region on the screen within the Reference Manual or one of the main menu command buttons at the bottom of the screen.

A decision block 208 acts upon the value returned by subroutine J for the KID corresponding to the subject's selection to determine if it is one of the values: RN (Reference Manual Next Page), RP (Reference Manual Previous Page), RC (Reference Manual Table of Contents), RA (Reference Manual Animals tab), RI (Reference Manual Icons tab), RM (Reference Manual Maps tab), RX (Reference Manual Notes tab), or RG (Reference Manual Glossary tab). A corresponding value for OUT ranging between 65 and 72 is associated with each of these KID values. An affirmative response to decision block 208 leads to a block 210 which looks up FID from the framed destination table using the appropriate KID. A block 212 then sets the RFID equal to the FID found in the frame destination table.

After the value of RFID is reset in block 212, subroutine P is called to record the selection by the user as part of the raw subject data stored on hard drive 12d. A return from subroutine P brings the subject back to the display of the selected page in the Reference Manual, at block 202.

A negative response to decision block 208 results in a block 214 determining that the subject has made a selection from the Table of Contents. Thereafter, the logic again continues with block 210, using an appropriate KID for the selection. The Reference Manual includes information about each type of animal under consideration for inclusion in the zoo, including the animal's initial cost, yearly maintenance cost, preferred environment/enclosure, desirable maximum density, etc. Maps of the site show the topology of the surrounding land and existing roads. Notes made by the previous Assistant Superintendent of Parks and others provide information about the project and concerns voiced by residents regarding the Zoo and the focus of its design. Each of these types of data may be used by the subject in deciding how to design the zoo layout or in responding to memos.

Figure 7A:
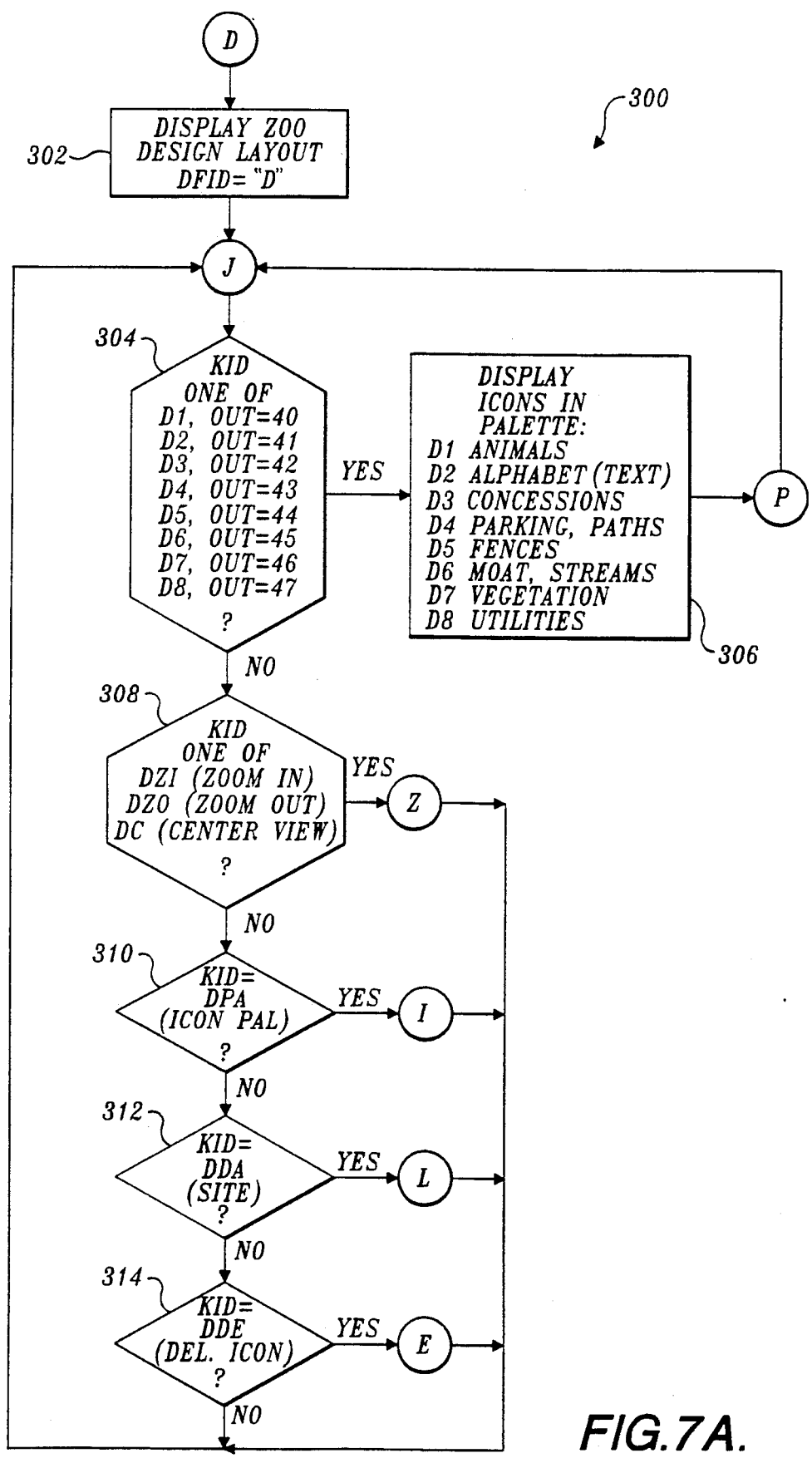

At some point during the exercise, subject 19 may decide to begin laying out the preliminary design for the zoo. The design involves selecting the animals that are to be included, the type of enclosures to be provided, location of foot paths, roads, concessions, and vegetation, and the types of exhibits. As shown in FIG. 4A, block 80 directs the program logic to begin with the zoo design when the subject selects Zoo layout control button 96 from the main menu. The design of the zoo begins with a subroutine D, which is shown in FIG. 7A at a flow chart 300, starting at a block 302. In this block, a zoo layout screen is displayed, generally as shown in FIG. 7B, and a design frame identification (DFID) is set equal to "D".

Figure 7B:
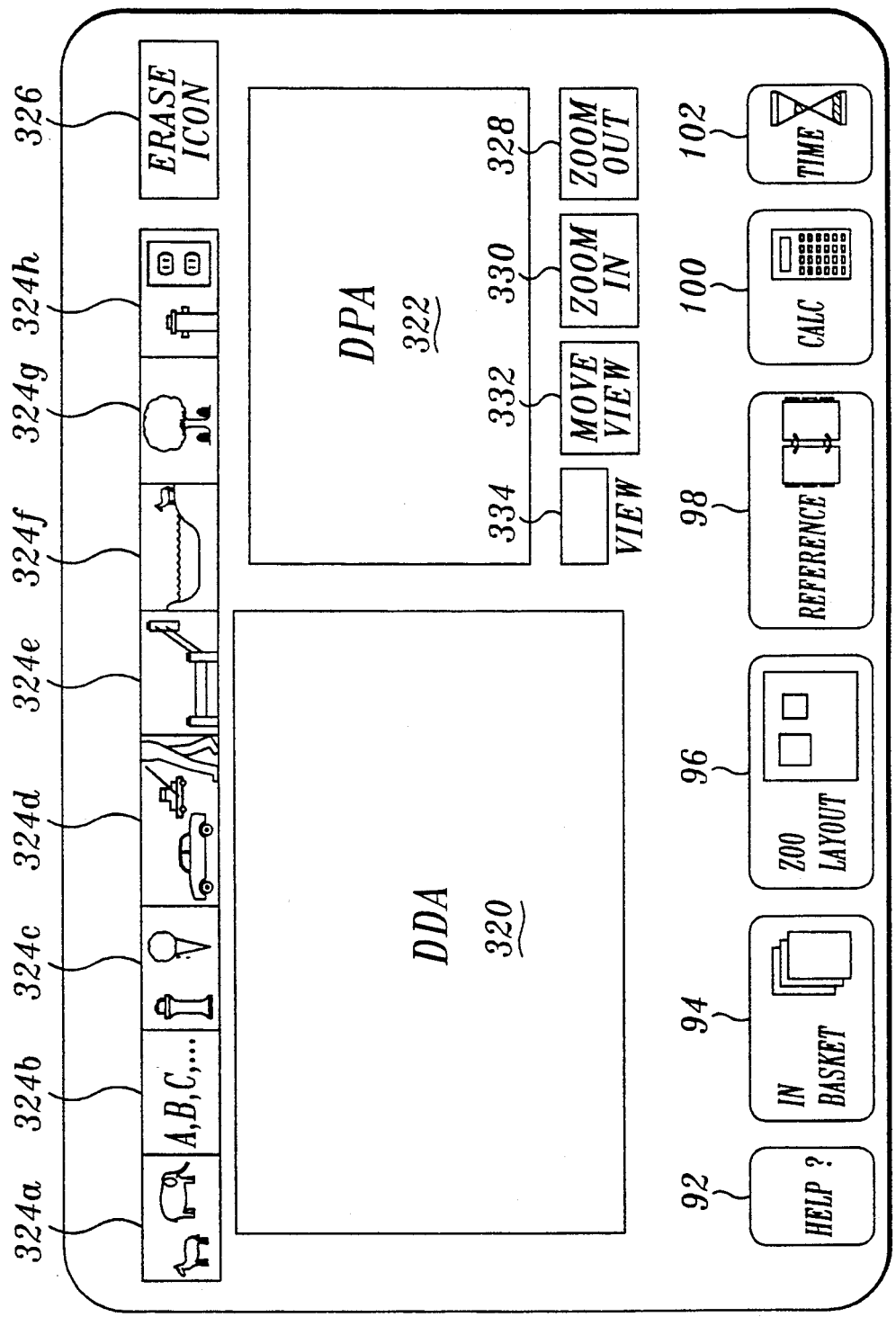
FIG. 7B is a screen display of the zoo layout configuration presented to the subject.

The screen in FIG. 7B includes a design area 320, an icon palette area 322, a plurality of icon categories 324a through 324h, an Erase icon control 326, a Zoom-out control 328, a Zoom-in control 330, a Move View control 332, and a View control 334. In addition, the main menu control buttons are again displayed at the bottom of the screen. By selecting one of the icon categories 324, the subject causes a set of icons of the selected category to be displayed in icon palette area 322. If one of the icons displayed in icon palette area 322 is touched by the subject, it is selected and can be positioned in design area 320. The various categories of icons 324 include Animals 324a; Text (i.e., alphabet characters that can be assembled into words) 324b; Concessions 324c; Roads, Walkways, and Paths 324d; Fences and Barricades 324e; Moats, Ponds, and Streams 324f; Vegetation 324g; and Utilities 324h. Once an icon is selected and positioned in design area 320 by the subject, it can be moved by selecting it and dragging it to another portion of the display. Icons positioned in design area 320 can also be erased with Erase icon control 326.

Since the actual design and icon palette areas are relatively limited in size, the subject can zoom-in and zoom-out to increase the resolution with which icons and text are viewed and positioned. A particular portion of the design area or icon palette area that the subject wants to be centered in the view displayed is selected, and the shifted view is achieved by touching Move View control 332. Using the icons, the subject can designate the animals that are to be on display in the zoo, design their enclosures, lay out access paths, roads and parking, and virtually all other aspects of the zoo, and can then change the design by moving the icons about and/or erasing them at will.

Referring back to FIG. 7A, following the initial display of the zoo design screen described above, subroutine J is called to enable the subject to make a selection by touching a particular portion of the design screen corresponding to one of the controls or icons. In response to a selection by the subject, return from subroutine J leads to a decision block 304, which determines if the KID of the selected control is one of the eight Icon categories 324a through 324h, which have corresponding values for OUT ranging from 40 through 47. An affirmative response to decision block 304 leads to a block 306, wherein the appropriate icons corresponding to the categories selected by the user are displayed in icon palette area 322. Thereafter, subroutine P is called to record the subject's choice in the raw subject data, which will later be analyzed to determine the characteristic task-processing style of the subject. Following subroutine P, subroutine J is again called, enabling further selections by the subject.

A negative response to decision block 304 leads to a decision block 308, which determines if the KID assigned to the selection made by the subject corresponds to DZI (Zoom-in), DZO (Zoom-out), or DC (Move Center View). If so, a subroutine Z is called. The details of subroutine Z are discussed below.

A negative response to decision block 308 leads to a decision block 310 to determine if the KID assigned to the selection is equal to DPA, which corresponds to a selection of one of the icons in icon palette area 322. If so, a subroutine I is called. Alternatively, a decision block 312 determines if the KID is equal to DDA, corresponding to a selection in design area 320, and calls a subroutine L if the response is positive. A negative response to decision block 312 leads to a decision block 314, which checks the KID to determine if it equals DDE, the result if the subject touched Erase icon control 326. An affirmative response to this determination causes a subroutine E to be called, and a negative response causes subroutine J to be called.

In the event that the subject has elected to zoom-in, zoom-out, or move the center view within either design area 320 or icon palette area 322, subroutine Z is called, as shown in a flow chart 230 in FIG. 7C. Subroutine Z begins with a decision block 232 that determines if the subject has elected to zoom-in. An affirmative response leads to a block 234, which displays a message informing the subject that the zoom-in mode is active and directing the subject to touch the spot in the design area (site) or the icon palette area on which to zoom-in. Thereafter, a subroutine S is called.

Figure 7D:
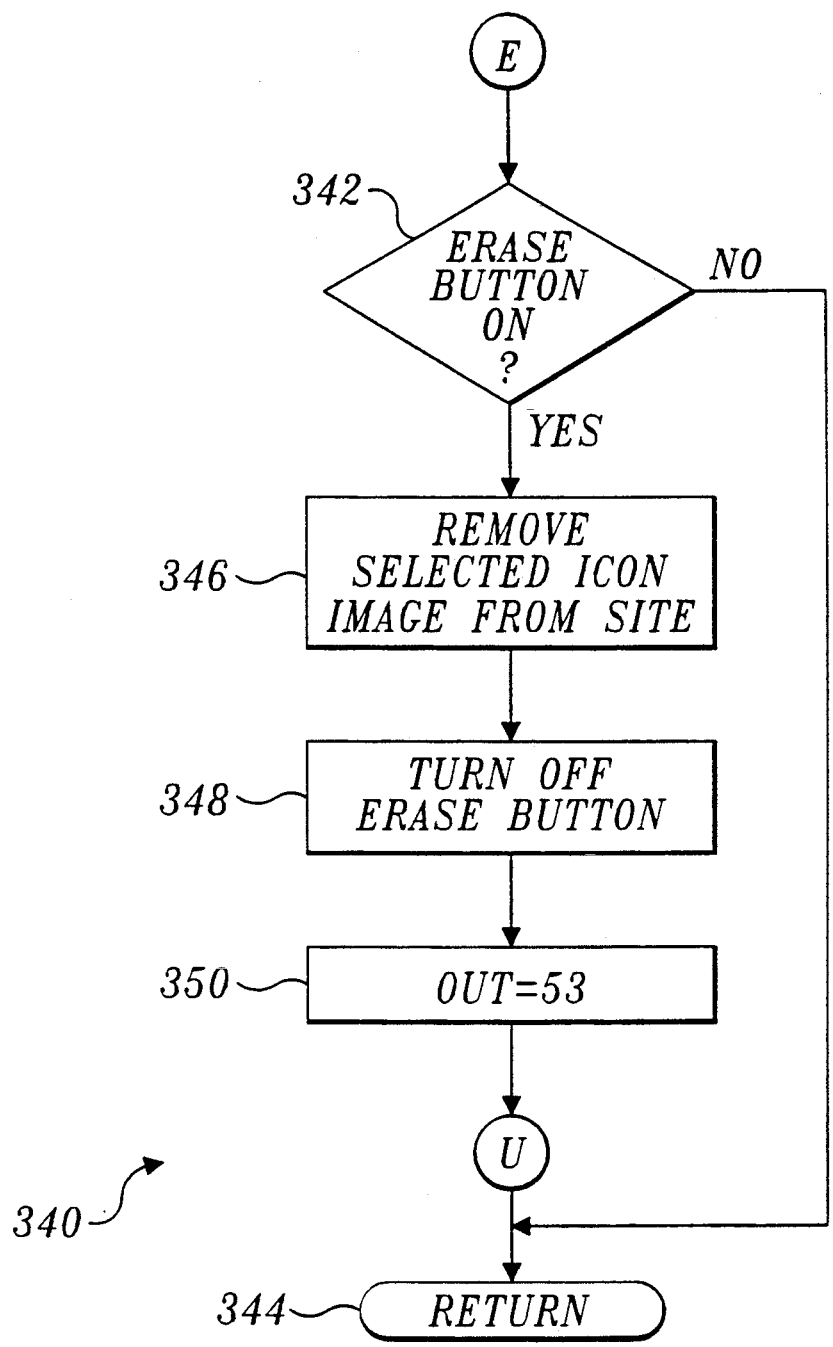
Figure 7E:
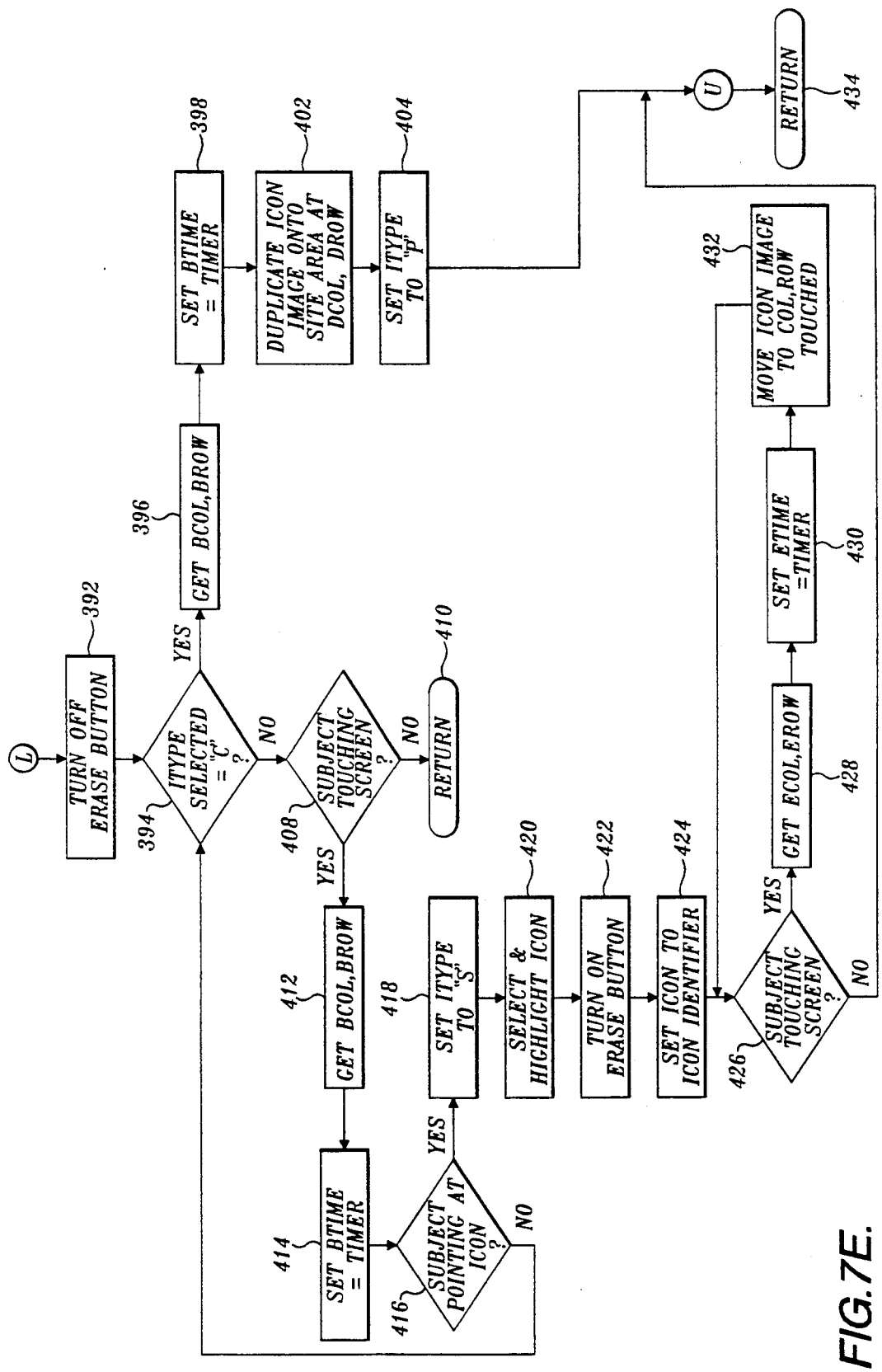
Figure 7F:
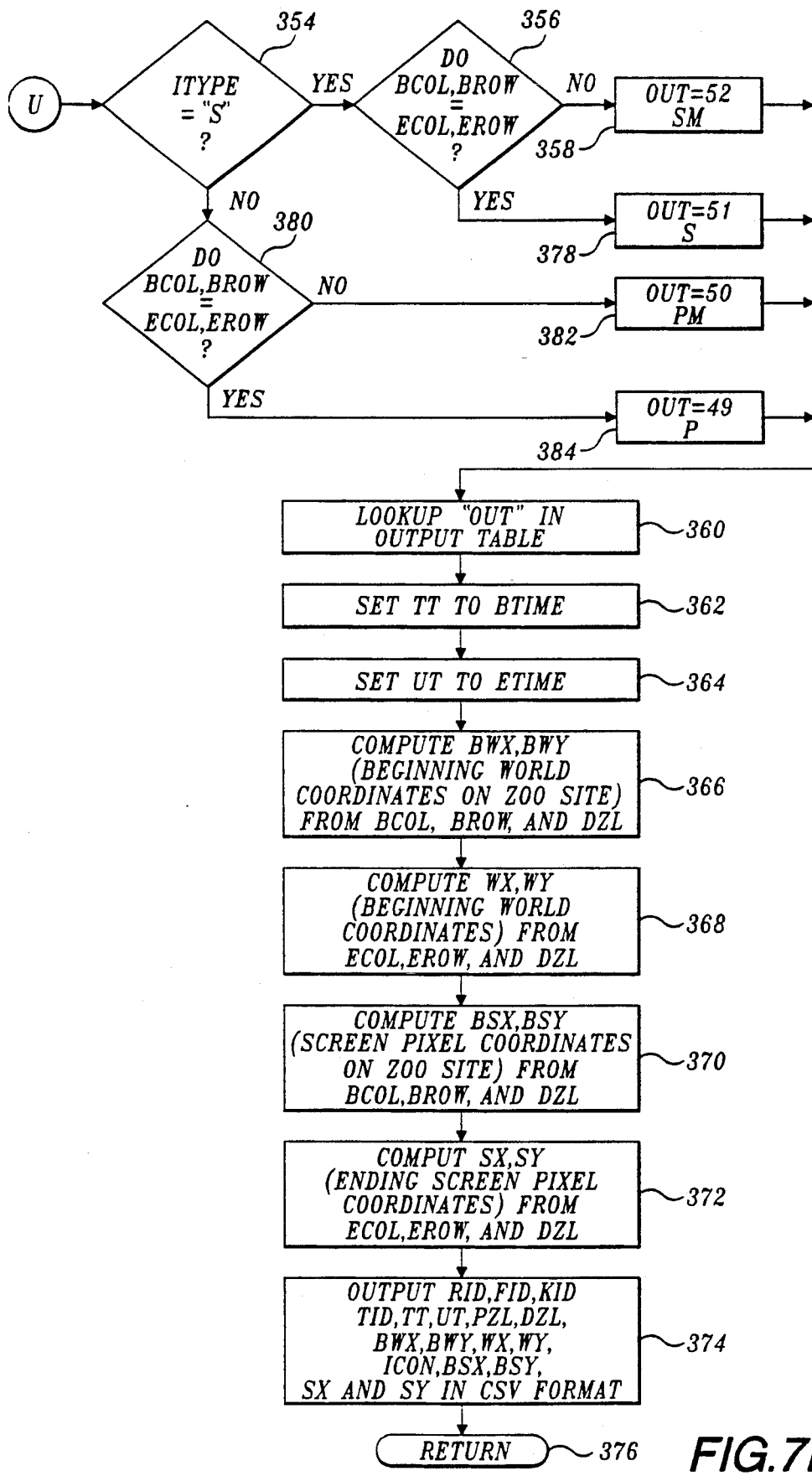
Figures 7G, 7H, 7I:
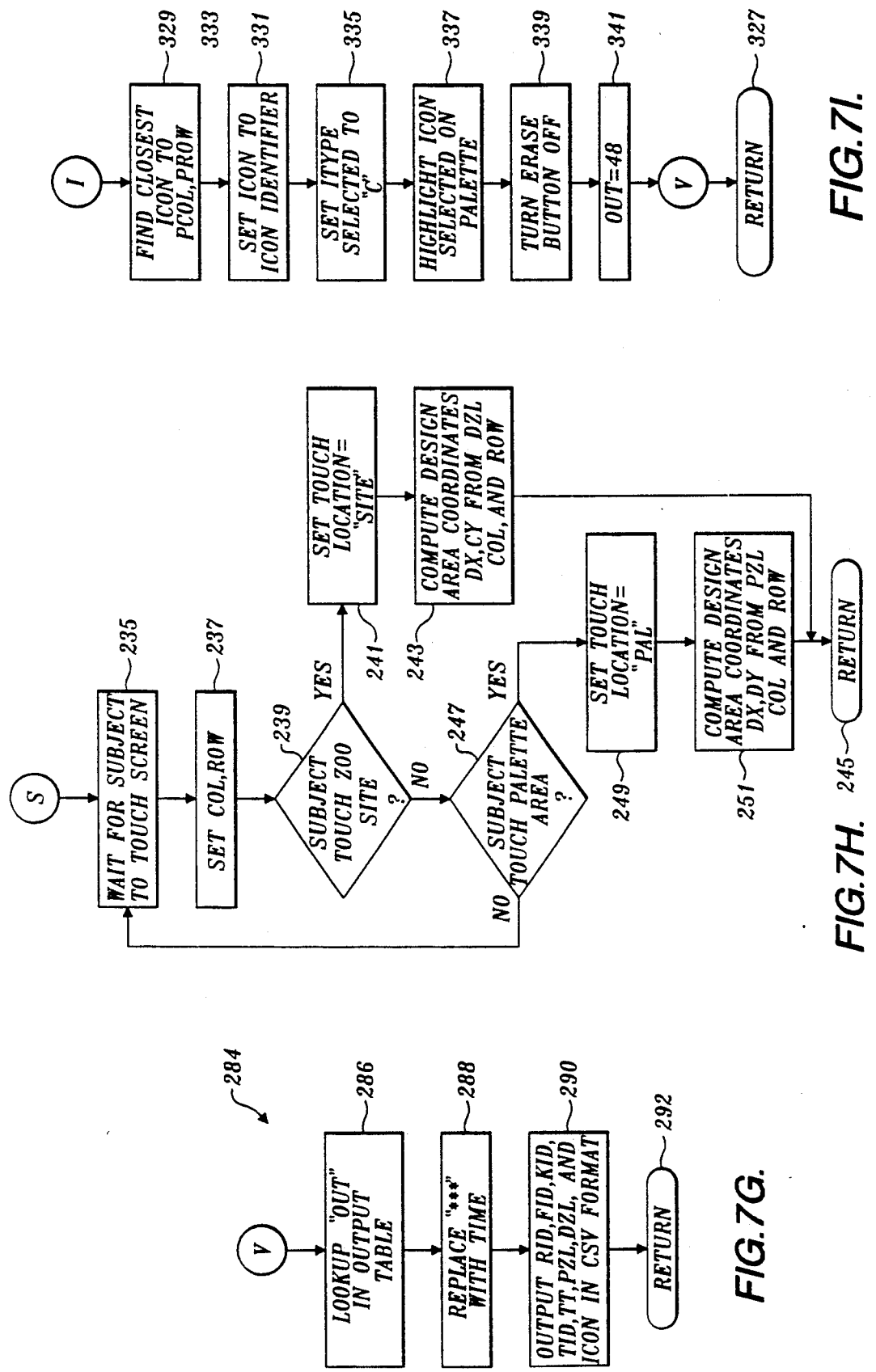

FIG. 7H shows the steps implemented in subroutine S. Beginning with a block 235, the program waits for the subject to touch the screen, and thereafter, in a block 237, sets the column and row where that touch occurred. A decision block 239 determines if the subject touched design area 320, and if so, sets the touch location equal to SITE in a block 241. A block 243 then computes the percentage change for the design area (coordinates DX and DY) from a value DZL, the column and row corresponding to the existing size of the design area. The values for DX and DY represent the percentage change in the displayed area for the zoom-in (or zoom-out). Following block 243, the subroutine proceeds to a return block 245.

A negative response to decision block 239 leads to a decision block 247, which determines if the user has selected icon palette area 322 for zoom-in, zoom-out, or repositioning. An affirmative response sets the touch location equal to PAL, corresponding to the icon palette area, in a block 249. A negative response to decision block 247 returns to block 235 to wait for the subject to touch the screen in one of the two positions required for activating the sizing and centering functions carried out in subroutine S in the selected area of the display screen.

After block 249, a block 251 computes the percentage change to the icon palette area using coordinates DX and DY based on the existing column and row sizes for the icon palette area, represented by PZL. Thereafter, the logic returns to subroutine Z at block 245.

After subroutine S returns to subroutine Z in FIG. 7C, a decision block 236 determines if the user had touched design area 320, and if so, a block 238 zooms in on the portion of design area selected. A block 240 updates DZL for the zoom level decrease in size and proceeds to a block 242, which assigns a value 59 to OUT.

A negative response to decision block 236 leads to a block 244 that zooms in on icon palette area 322. A block 246 updates PZL for the decremented palette zoom level, and a block 248 assigns a value of 61 to OUT.

Referring back to decision block 232, a negative response leads to a decision block 250, which determines if zoom-out has been selected. If the response is affirmative, a block 252 displays a message to the subject indicating that zoom-out has been selected and that the subject should touch the portion of the design area or icon palette area that is to be affected by the zoom-out operation; subroutine S is then called. Following a return from subroutine S, a decision block 254 determines if the subject has touched design area 320, and if so, a block 256 zooms out on the selected spot in the design area. Thereafter, a block 258 resets DZL to the incremented site zoom level and a block 260 assigns 60 to the value for OUT.

A negative response to decision block 254 leads to a block 262, which zooms out on the icon palette area. A block 264 resets PZL to the incremental change in the palette zoom level, and a block 266 assigns a value of 62 to OUT.

A negative result from decision block 250 leads to a block 268, which indicates selection of the center image option. A block 270 advises the subject to touch the portion of the screen that is to become the new center of the view. Subroutine S is then called. Following return from subroutine S, a decision block 272 determines if the user has touched design area 320, and if so, block 274 centers on the selected spot in the design area. A block 276 then sets OUT equal to 57. A negative response to decision block 272 causes the display to center on the selected spot in icon palette area 322, and a block 280 assigns a value of 58 to OUT.

Following the assignment of values for OUT that occurs in each of blocks 248, 242, 266, 260, 280, and 276, a subroutine V is called. A flow chart 284 in FIG. 7G shows the steps implemented in subroutine V. A block 286 looks up the assigned value for OUT in the output table. The output table also includes a value "*" that is assigned to a variable TIME. A block 288 replaces "*" with the actual time at which subroutine V is called. A block 290 provides output of the values RID, FID, KID, TID, TT, PZL, DZL, and ICON as part of the raw subject output data stored on hard drive 12d. A return block 292 then returns to the calling program, which returns to subroutine Z in FIG. 7C, leading to a return block 282. A return from subroutine Z cycles back to subroutine J in flow chart 300, which is shown in FIG. 7A.

During the next call of subroutine J, if the subject selects icon palette area 322, decision block 3 10 calls subroutine 1, which is represented as a flow chart 327 in FIG. 71. Flow chart 327 begins with a block 329, that instructs CPU 12a to find the closest icon to the position touched by the subject and assigns the coordinates of the icon selected to PCOL and PROW, i.e., the column and row of the icon in the icon palette area that was touched by the subject. For example, if the subject is developing a monkey island in the design area, the subject may select an icon representing a chimpanzee from the icon palette area, so that it can be positioned in the design area. A value ICON is then assigned to the icon identifier associated with the selected icon, in a block 331. Thereafter, a block 333 assigns a value C to a variable ITYPE, indicating that the subject has chosen an icon in the icon palette area.

In a block 335, the icon selected in the icon palette area is highlighted, indicating that it has been selected by the subject. A block 337 turns Erase icon control 326 off, and a block 339 assigns a value of 48 to OUT. Thereafter, the subroutine V is called, which carries out the steps of FIG. 7G, as discussed above.

Once subject 19 has selected an icon from icon palette area 322, the subject typically selects a spot in the design area 320 for placement of the icon. For example, if subject 19 selects an elephant icon from icon palette area 322, the next action by the subject would typically be to touch design area 320 at the position where the elephant will be placed within the zoo. Accordingly, following selection of the icon in subroutine 1, flow chart 300 again calls subroutine J, enabling the subject to touch the portion of the design area where the icon selected is to be positioned. Based on that response, decision block 312 calls a subroutine L.

Subroutine L is disclosed in FIG. 7E as a flow chart 390, which begins with a block 392. In block 392, Erase icon control 326 is turned off. Thereafter, a decision block 394 determines if the value ITYPE selected is equal to "C," and if so, gets the beginning column and beginning row "BCOL, BROW" for the selected icon in a block 396. It will be recalled that ITYPE is set equal to "C" when the icon is initially selected but has not yet been positioned. A block 398 sets a value BTIME equal to the current timer value. Thereafter, a block 402 duplicates the selected icon on design area 320 at the position selected by the subject, corresponding to DCOL and DROW. A block 404 then sets the value ITYPE equal to "P" and calls subroutine U.

Subroutine U is shown as a flow chart 352 in FIG. 7F. Flow chart 352 begins with a decision block 354 that determines if the user has just selected an icon in the design area, i.e., if ITYPE equals S. In this call to subroutine U, the result is negative. However, if the result is affirmative, a decision block 356 determines if the beginning column and beginning row (BCOL, BROW) equal the end column and end row (ECOL, EROW), i.e., whether the selected icon has yet been moved by the subject. If the values are not equal, a block 358 sets the value of OUT equal to 52 indicating that an icon has been selected and moved. Alternatively, an affirmative response to decision block 356 sets the value OUT equal to 51 in a block 378, indicating that an icon in design area 320 has merely been selected, but not yet moved. Following blocks 358 or 378, a block 360 looks up the value assigned to OUT in an output table and assigns the touch time (TT corresponding to the actual time at which the subject touched the icon to the variable BTIME (for beginning time) in a block 362. When the subject releases the icon that was touched by removing the pointer from the touch-sensitive screen display, a block 364 sets a variable untouch (UT) equal to the ETIME (end time).

Thereafter, a block 366 computes the Beginning World Coordinates BWX and BWY for the icon's position in design area 320, using BCOL, BROW, and DZL. Similarly, a block 368 determines Ending World Coordinates WX and WY from ECOL, EROW, and DZL. The term "world coordinates" refers to an absolute coordinate system applied to design area 320 that is independent of zoom-in, zoom-out, and selection of a different central viewpoint by the subject.

A block 370 computes BSX and BSY, corresponding to the beginning screen pixel coordinates for the selected icon in design area 320 using BCOL, BROW, and DZL. Likewise, a block 372 computes SX and SY, corresponding to the ending screen pixel coordinates, using ECOL, EROW, and DZL. These pixel coordinates correspond to the position in the actual view of the design site presented to the subject, based upon selection of zoom-in, zoom-out, or changes in the center of the area viewed by the subject.

A block 374 outputs the raw subject data comprising RID, FID, KID, TID, TT, UT, PZL, DZL, BWX, BWY, WZ, WY, ICON, BSX, BSY, SX, and SY in comma separated values (CSV) format, which as previously explained, are stored on hard drive 12d. A return block 376 then returns to the calling program.

A negative response to decision block 354 indicates that ITYPE equals P and leads to a decision block 380 that determines if BCOL and BROW are respectively equal to ECOL and EROW. If not, the icon has been moved, and a block 382 sets OUT equal to 50. Otherwise, the icon is being initially positioned, and a block 384 sets OUT equal to 49. Following either blocks 382 or 384, subroutine U proceeds with block 360, as already explained.

With reference back to flow chart 390 (subroutine L in FIG. 7E), a negative response to decision block 394 occurs if the subject has already placed an icon within design area 320, and is selecting it for repositioning. A decision block 408 determines if the subject is touching the screen, and if not, a return block 410 returns to the calling program. Otherwise, a block 412 gets the coordinates for the portion of the screen being touched by the subject, which are assigned to BCOL and BROW. A block 414 then sets the value BTIME equal to the current timer value.

A decision block 416 determines if the subject is pointing at an icon within the design area, and if not, returns to decision block 394. However, if the subject is touching one of the icons in the design area, a block 418 sets the value ITYPE equal to S. Thereafter, a block 420 selects and highlights the icon that was touched on the screen by the subject, and a block 422 turns on the Erase icon control 326. The variable ICON is then set to the icon identifier for the selected icon in a block 424. If the subject is touching the screen, a decision block 426 then points to a block 428, which determines end column and end row coordinates (ECOL and EROW), indicating the new position for the selected icon within the design area. A block 430 sets a value ETIME corresponding to the end time equal to the current value of the timer. Then, a block 432 moves the selected icon image to the column and row position touched on the screen and returns to decision block 426. Once the user stops touching the screen, indicating the icon has been positioned where desired, a negative response from decision block 426 calls subroutine U. After a return from subroutine U, subroutine L returns to the calling routine through a return block 434.

Selection of Erase icon control 326 in flow chart 300 (FIG. 7A) causes decision block 314 to call subroutine E, which is shown in a flow chart 340, in FIG. 7D. Flow chart 340 begins with a decision block 342, which determines if Erase icon control 326 is on, and if not, proceeds to a return block 344. However, if the Erase icon control is on, a block 346 removes the selected icon image from design area 320. After this operation, a block 348 turns off Erase icon control 326 and sets the value for OUT equal to 53 before calling subroutine U. Following a return from subroutine U, flow chart 340 proceeds to return block 344, which returns back to flow chart 300 (in FIG. 7A).

By successively selecting icons from the different types of icons displayed in the icon palette area and positioning them within the design area, the subject can develop a relatively sophisticated zoo layout, with all the amenities that one would expect to find in a small town zoo. Each selection by the subject and every action to reposition or remove an icon are recorded in the raw subject data in the sequence that they occur. The time required for the subject to reposition an icon is also recorded, providing an indication of how meticulous the subject is in resolving the task. This characteristic relates to one of the parameters that define the subject's task-processing style, as discussed below.

Figure 10:
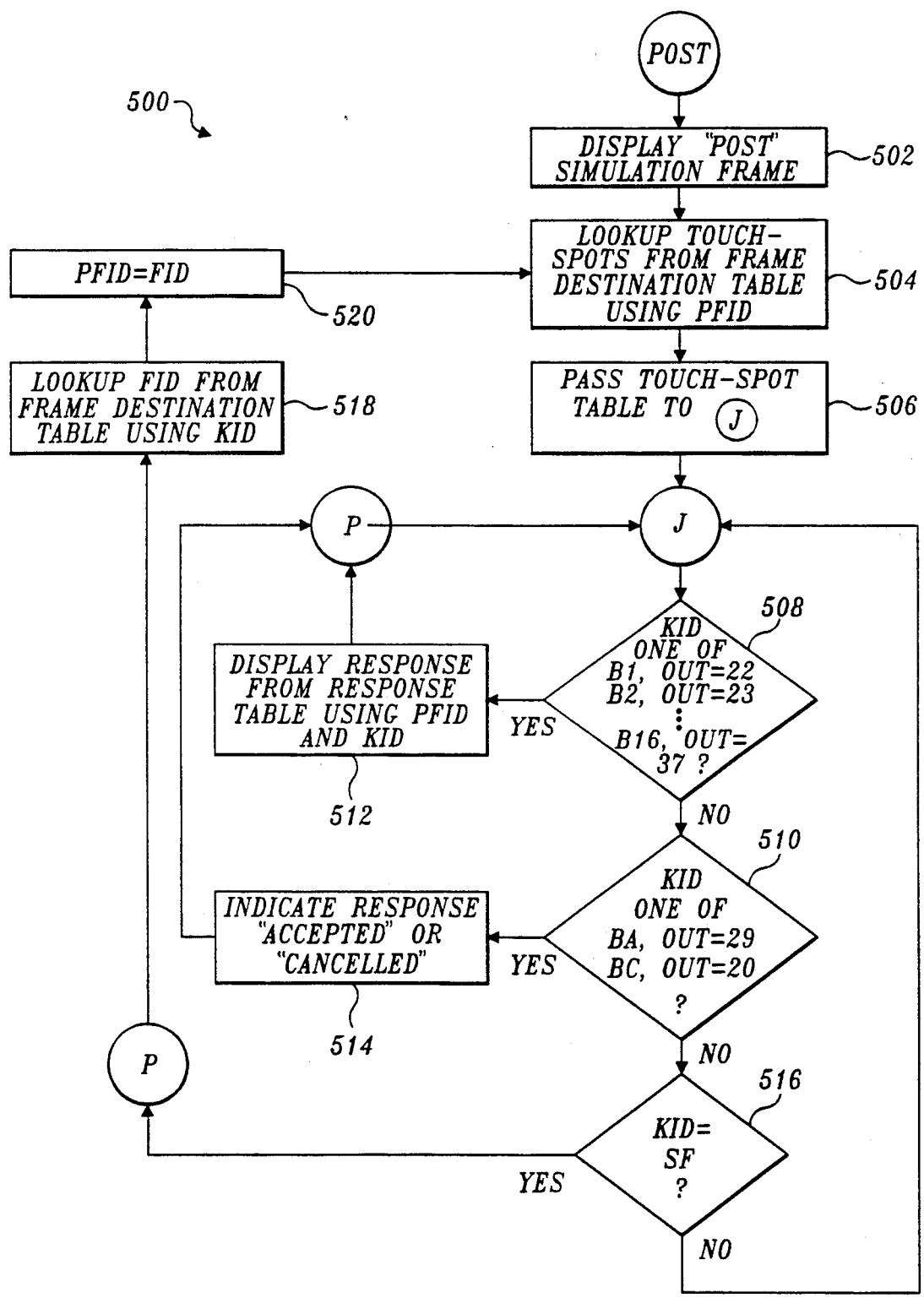
FIG. 10 is a flow chart of a post-assessment subroutine in which the individual responds to questions about the exercise.

At the completion of the exercise, subject 19 is requested to respond to specific questions, which represent a critique of the exercise. A flow chart 500, shown in FIG. 10, generally shows the steps implemented during this critique. A block 502 displays a first post-simulation frame. In this frame, the subject is asked "Which statement best describes your overall experience for the exercise?" and is presented with a four-by-four array of touch-sensitive regions, each region corresponding to one of 16 responses from which the subject is asked to select a best response. Using the post-simulation frame identification (PFID) corresponding to this screen display, a block 504 looks up a list of touch spots for each of the elements presented, including Accept and Cancel controls. A block 506 then passes the appropriate touch spot table to subroutine J, to enable selection of one of the regions on the screen by the subject.

A decision block 508 receives the KID for the region selected from subroutine J and determines if it corresponds to one of the 16 options presented in the array, each option having a corresponding value for OUT assigned to it. If one of the 16 array regions is selected by the subject, the response is displayed in a block 512, using the PFID and KID associated with this display that were returned by subroutine J. Subroutine P is called to provide output of the raw subject data corresponding to that selection. Following a return from subroutine P, subroutine J is again called, until all further input or selection of touch-sensitive regions on the display by the subject is completed.

A subject can review all of the 16 optional responses to each question before making a decision, or may elect to accept a response that seems appropriate without reviewing all of the options. A touch-sensitive control with a corresponding KID equal to BA is labeled "Accept Response" to indicate that the subject considers the current displayed response to be the best response to the inquiry presented. After a subject reviews the suggested response for a region of the array, a button labeled "Cancel Response" having a KID equal to BC must be selected before another array region can be selected for display. Accordingly, a decision block 510 determines whether the returned KID from subroutine J is equal to BA or BC and assigns values to OUT equal to 19 or 20, respectively. If so, a decision block 514 indicates that the response is accepted or canceled on the screen, and then calls subroutine P to record the action.

If the KID returned from subroutine J is equal to SF, indicating that the subject has elected to continue on with the next post-simulation screen display, subroutine P is called, and following output of the raw subject data corresponding to that election, a block 518 looks up the FID in the frame destination table for the next post-simulation frame, using the current KID. Thereafter, a block 520 sets the current PFID equal to the FID from the frame destination table and returns to block 504. A negative response to a decision block 516 returns, and calls subroutine J for further input in the current frame.

During the exercise, each action by the subject in responding to the options presented, including positioning icons in the zoo design exercise, responding to memos by selecting from among the proposed choices, and reviewing data in the Reference Manual, and even in responding to the post-simulation critique produces raw subject data that are processed to determine the task-processing style exhibited by the subject during the exercise. After the subject has completed the exercise and the post-simulation critique, the raw subject data are statistically analyzed in respect to specific criteria or parameters that define the characteristic task-processing style of the subject.

Figure 11:
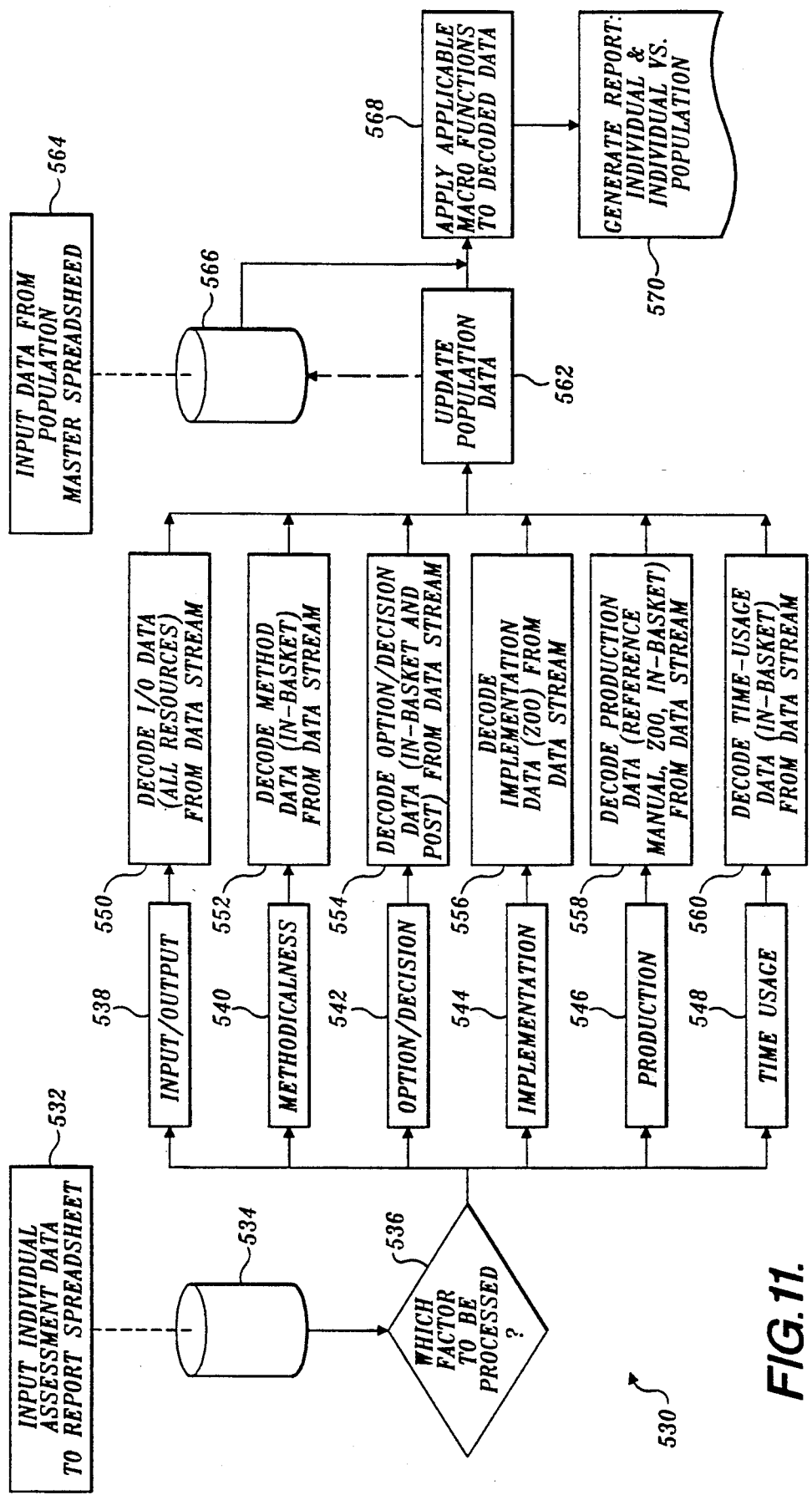
FIG. 11 is a flow chart showing the steps for analyzing the individual's task-processing style based on the data stream of raw subject data produced by the individual during the exercise.

FIG. 11 illustrates the steps carried out in processing the raw subject data, to develop meaningful criteria that define specific parameters characteristic of the person undergoing the assessment. A flow chart 530 in this figure begins with the step of inputting the individual's raw subject data to a report spread sheet in a block 532. In this step, the raw subject data recorded on hard drive 12d, which is labeled as a database 534, are read into a report spread sheet by block 532. The spread sheet carries out statistical analysis of the raw subject data, determining average values for certain types of input and output and performs other mathematical calculations that are required to process the raw subject data into the final report. Alternatively, a dedicated program can be written to carry out the steps implemented by the commercial spread sheet program preferably used.

A decision block 536 determines the parameters to be evaluated from the data being processed. Blocks 538 through 548 respectively represent each of the parameters defining the individual's task-processing style that are being evaluated. In block 538, the subject's input/output characteristic is determined; this parameter represents the relative number of accesses and relative times that the subject selected input data from the Reference Manual, from memos, and from all other resources of information presented and available to the subject during the exercise, compared against the number of times that the subject produced output, i.e, by designing the zoo layout or responding to memos. Certain individuals access considerable input data before they are willing to reach any decisions representative of output. Accordingly, a block 550 decodes all selections made by the subject to determine which are input and which are output, enabling a determination of the relative percentages and times at which input and output occurred.

Block 540 determines a parameter referred to as methodicalness, representing how methodical the subject was in accessing input data, for example, in reviewing the 16 options presented to the subject in responding to each of the memos in the In-basket and in responding to the post-simulation critique. Some individuals access every possible response in a 4×4 array, systematically working their way through the array, row-by-row, column-by-column. Such an individual is considered very methodical, compared to one who randomly samples responses in the array, without following any systematic order. A block 552 thus decodes method data from the In-basket and from the post-simulation critique to determine how methodical the subject was by evaluating whether the individual tended to follow a systematic pattern in accessing the proposed responses in each array.

Block 542 evaluates the number of options reviewed by the subject before reaching a decision, for example, by determining the number of responses in each of the arrays that were viewed by the subject before responding to the In-basket memos and to the post-simulation critique. A block 554 decodes the option/decision data from the exercise.

Block 544 evaluates a parameter referred to as implementation. This parameter determines whether the subject exhibits more of a general implementation method or a specific implementation method, primarily by evaluating the output data produced by the subject in the zoo design layout data stream, as provided in a block 556. This parameter is discussed further below.

The parameter entitled production is determined in block 546. Individuals typically exhibit three different types of production: conceptual, selective, and implementive—but in varying degrees of each type. To determine this parameter, a block 558 decodes production data, representing all accesses by the subject to data in the Reference Manual, selections made in designing the zoo, and response to In-basket memos. Conceptual production is determined by the relative number of times that the subject accessed data such as background information contained in the In-basket memos or in the Reference Manual. Each such access is counted and correlated with the time it occurred during the exercise. Selective production corresponds to the relative number of times that available sources of data were selected for review, i.e., the number of times that proposed responses were considered or data in the Reference Manual were reviewed by the subject. Implementive production corresponds to actual output by the subject, i.e., selection of a response, or any action directed toward the design of the zoo. Comparison of these three types of production or activity show where the subject placed maximum emphasis during the exercise. Finally, block 548 reviews time usage, to determine the amount of time spent by the subject, dwelling upon In-basket response grid options. A block 560 decodes the time usage data from the raw subject data stream.

In a block 562, the results of each of the blocks 550 through 560 are used to update data for the general population of all other subjects that have undergone the assessment, which are stored in a population database 566. A block 564 downloads the population master spread sheet used to compile the population database that is updated by block 562. This population database provides a reference and serves as a comparison of the present subject to the average for all other subjects with regard to each of the parameters that define task-processing style. A block 568 then applies applicable macro functions to the decoded data for each of the parameters, to generate specific numerical values for each parameter and to normalize the data as required in generating a report for the subject. This report is printed in a block 570. The report shows each of the parameters exhibited by the subject during the exercise, along with an evaluation of the population data for other subjects who have taken the assessment. Text explaining the report is also included in the printout.

FIGS. 12A through 12J illustrate various aspects of the report compiled for a subject. For example, in FIG. 12A, the relative input/output parameter for the subject is displayed in a graph 600. The input and output of the subject are compared to the same parameter of other subjects taking the test in the upper portion of FIG. 12B, where a line 602a represents the subject's input, line 602b indicates the subject's output over time, and lines 604a and 604b, respectively, indicate the input and output for the population of subjects previously taking the assessment. Bar graphs 606a and 606b also show input versus output as a function of time for the subject in the lower part of FIG. 12B.

Figure 12A:
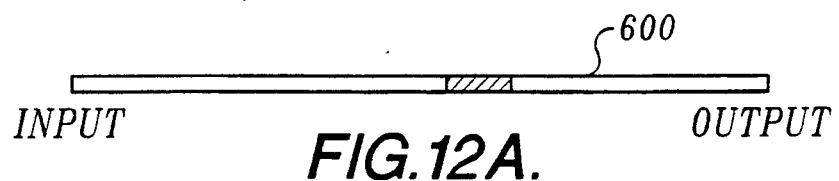
FIGS. 12A–12K illustrate examples of various aspects of the report produced for an individual who has taken the exercise.
Figure 12B:
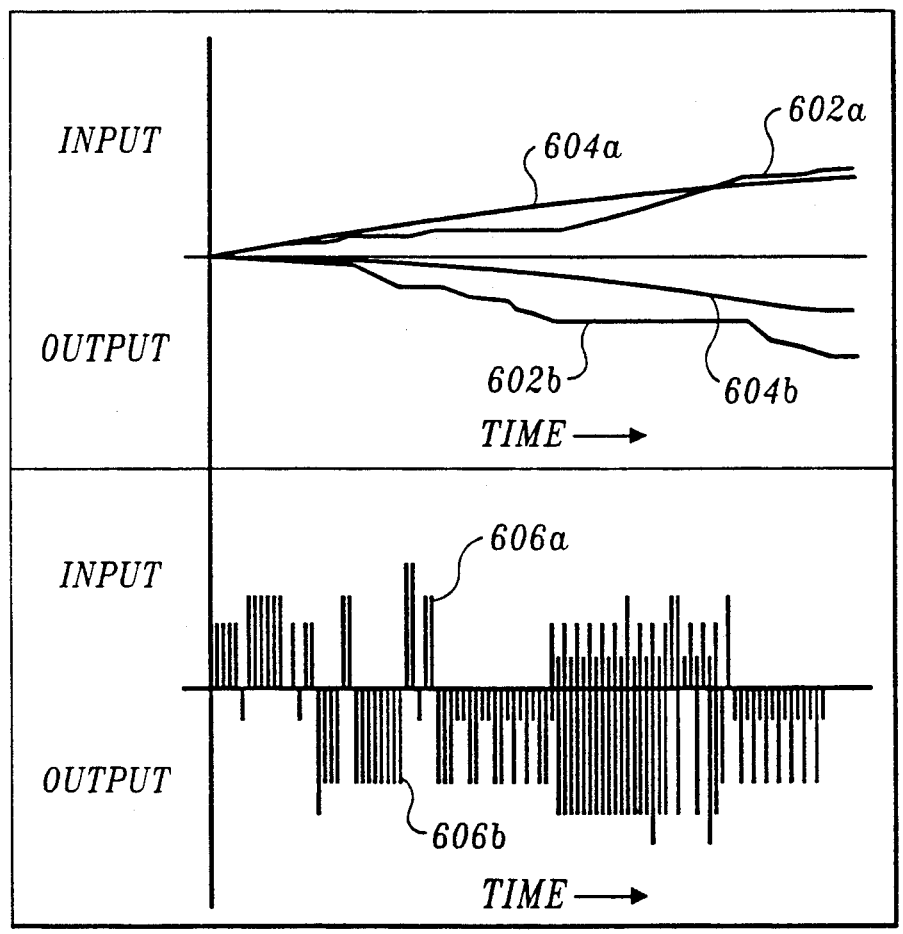
Figure 12C:
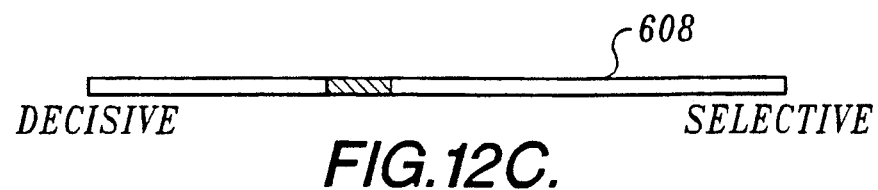
Figure 12D:
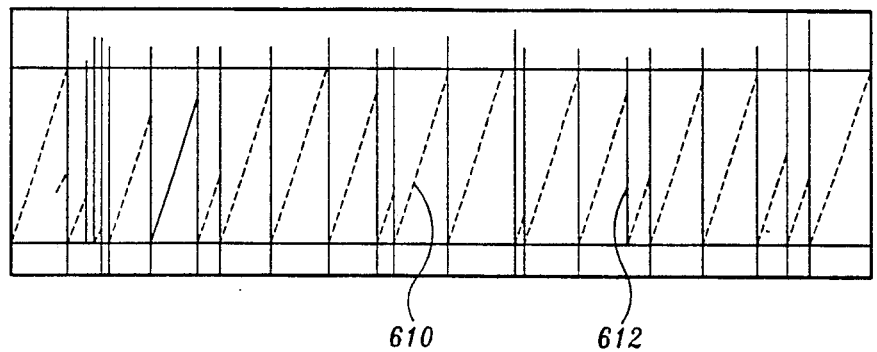

In a graph 608, FIG. 12C shows the relative option/decision parameter for the subject, indicating how decisive versus selective the subject is. In FIG. 12D, a plurality of dot segments 610 indicate the relative number of options reviewed by the subject before making a decision, where each decision is represented by a vertical line 612.

Figure 12E:
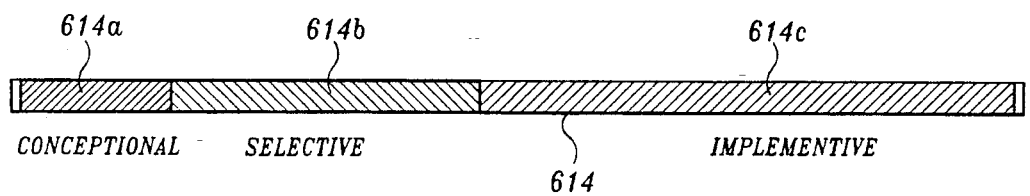
Figure 12F:
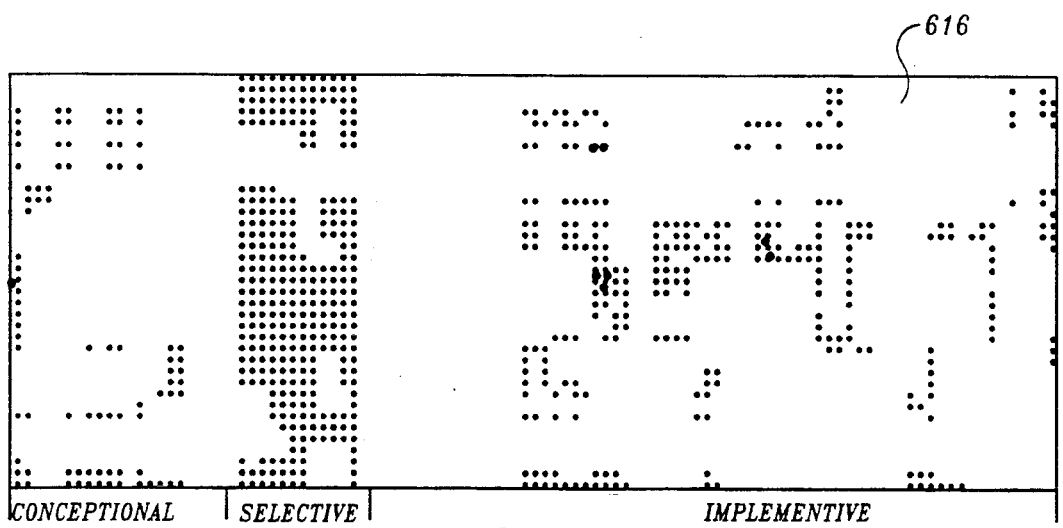

A bar graph 614 in FIG. 12E includes three different sections representing conceptual, selective, and implementive production 614a, 614b, and 614c, respectively. These parameters are also shown in FIG. 12F, where each of the dots 616 correspond to selections or activity by the subject in each category during the exercise, as explained above. The size of dots 616 indicate the relative concentration of activity in one screen display.

Figure 12G:
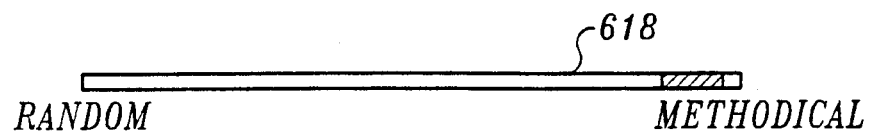
Figure 12H:
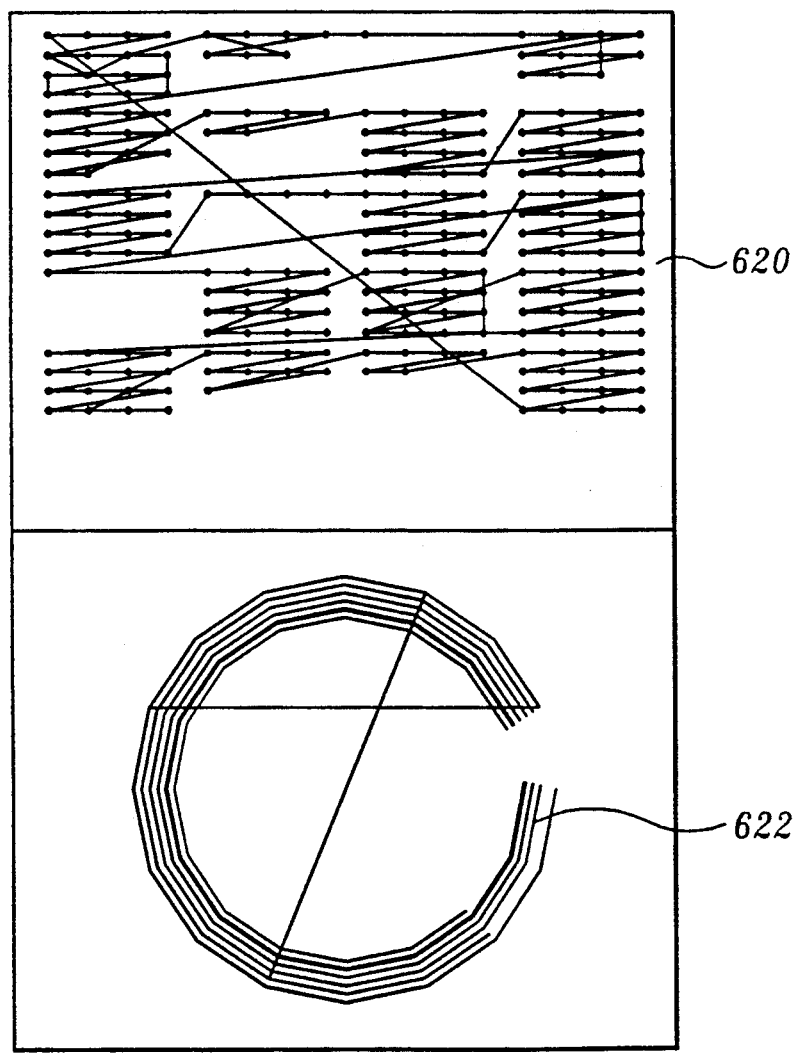

In FIG. 12G, a bar graph 618 shows the relative methodicalness of the subject, and in FIG. 12H, this parameter is shown in two different graphs 620 and 622. In graph 620, each proposed response to a memo and to the post-simulation critique that was viewed by the subject is shown as a dot connected to other dots in the order in which they were accessed, thereby graphically indicating how methodically and systematically the subject worked through the array in reviewing each of the options. In a subject who is very methodical, the progression through each of the options follows a common and consistent pattern, with very few random selections or jumping between elements for re-review. Similarly, in graph 622, a methodical individual is represented by a circular pattern having a series of regular chords proceeding around a circle, with very few lines crossing the circle diametrically. A corresponding graph for a person who is not methodical would have lines crossing the circle diametrically in a very random arrangement.

Figure 12I:
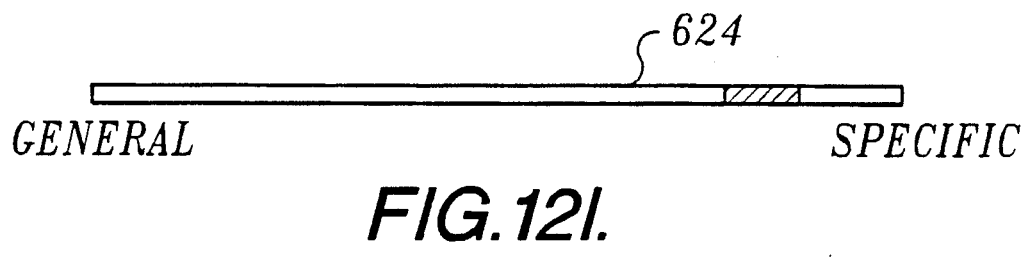
Figure 12J:
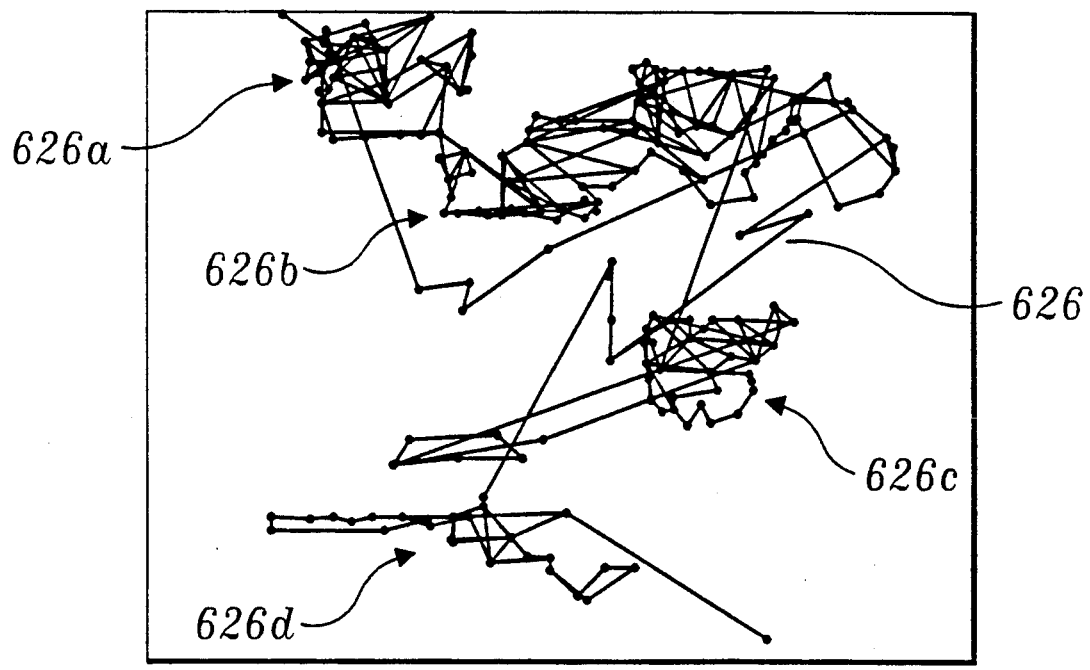

In FIG. 12I, a graph 624 indicates the implementation method exhibited by the subject, indicating whether the subject is relatively more specific or general in this attribute. A graph 626 in FIG. 12J illustrates how this determination is made, by showing the spatial concentration and order of placement of icons in the design area. For example, in respect to the data shown in FIG. 12J, the individual apparently concentrated on four areas in laying out the design of the zoo, the areas identified at, respectively, 626a, 626b, 626c, and 626d. The cluster of dots and interconnected lines in each of these four areas indicates that the subject worked toward specific goals in designing that area of the zoo. Each dot in the area represents an icon placement. For example, area 626a might represent a monkey island with a moat around it and selected vegetation and monkeys placed thereon by the subject. Similarly, area 626b might represent an enclosure for elephants, wildebeests, and other appropriate animals selected by the subject. The connectivity between the dots within each of these areas shows that the subject concentrated on completing that area before moving on to another. Some individuals jump from one area to another to another, without any attempt to complete one phase of the design before proceeding with the next. Such an individual thus exhibits a general implementation method.

Figure 12K:
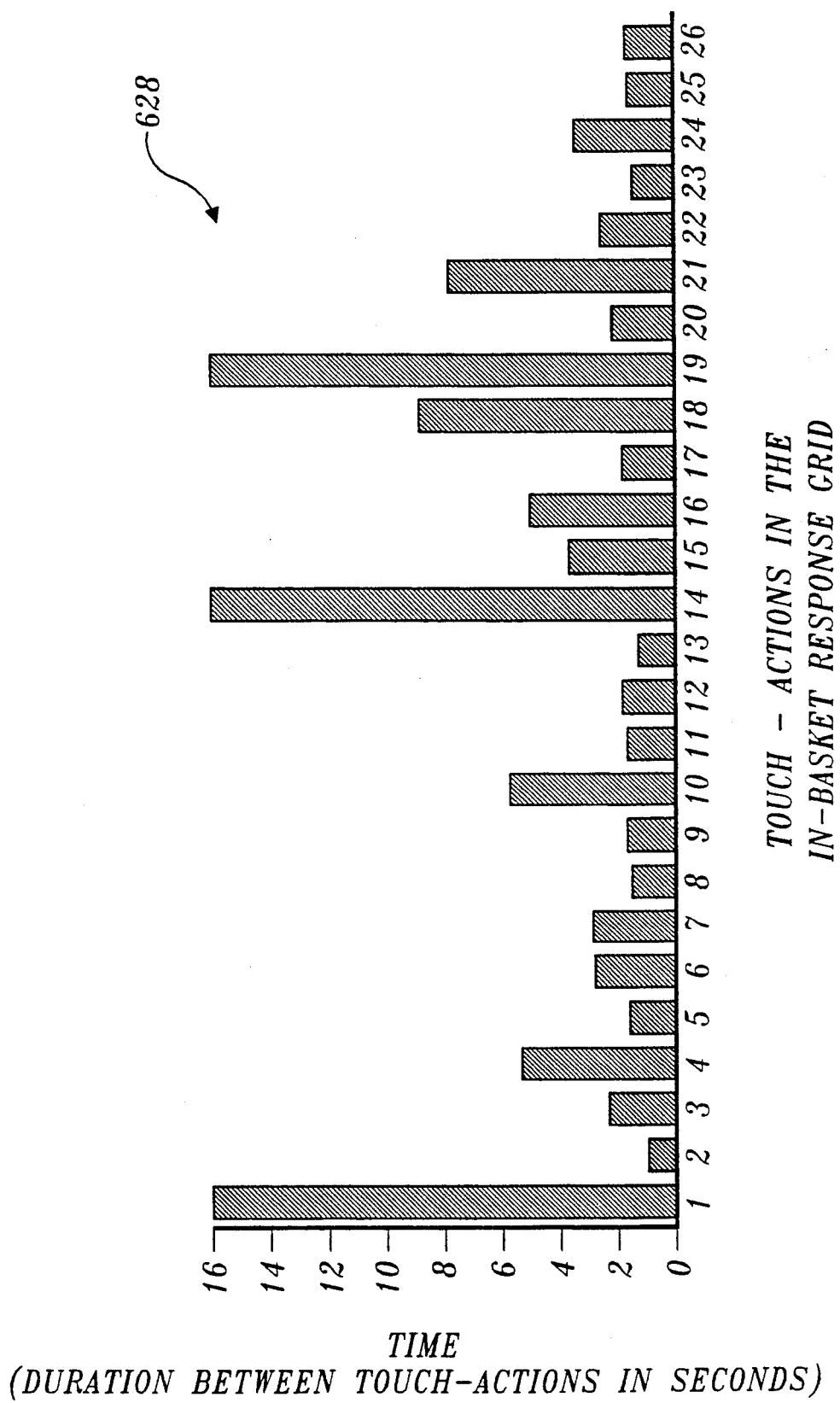

In FIG. 12K, a duration chart 628 shows the pattern of a subject's time usage as a function of unique touch actions or selections made while using the In-basket response grid. For example, with respect to FIG. 12K, touch action number one indicates that the subject dwelled upon the first In-basket response grid item selected for 16 seconds. FIG. 12K also shows that the average time spent considering or dwelling upon a response grid option was 3.29 seconds. An individual with a low overall average dwell time for considering the response grid options, compared to one with a relatively greater average time, is considered to be more uniform in time usage and, comparatively, to have a greater need for closure.

By evaluating the data presented in the report, it is possible to determine the subject's task-processing style, and to compare it with others who have taken the assessment. The data generated by the assessment determines the parameters, which can then be used in determining whether a subject is suited for a particular job or to otherwise evaluate that individual for other purposes. Alternatively, this information may be used in training individuals to improve their efficiency in resolving situations. Since the results of the assessment can be produced within minutes after the simulated task is completed, the resulting report represents an immediate feedback that can be used to reinforce positive changes in the individual's task-processing style or to correct undesirable traits in it.

Although the preferred embodiment of the invention disclosed herein makes use of a task involving design of a zoo, it should be apparent that many other totally different simulated tasks can be presented to a subject, and that the subject's task-solving style can then be assessed using the same technique described above. The nature of the task is relatively unimportant, so long as it does not require specific knowledge or skills on the part of the subject, unless those skills also represent aspects of the test that are to be assessed.

While the preferred embodiment of the invention has been illustrated and described, it will be appreciated that various changes can be made therein without departing from the spirit and scope of the invention. Accordingly, the scope of the invention is to be determined entirely by reference to the following claims.

The embodiments of the invention in which an exclusive property or privilege is claimed are defined as follows:

1. A computer implemented method for assessing a task-processing style of an individual, comprising the steps of:
   a. defining a simulated situation for the individual with scenario data that are presented to the individual on a computer-controlled display;
   b. making available resource data to the individual on the computer-controlled display so that the individual can optionally select and review the resource data, the resource data being, at least in part, usable by the individual to resolve the simulated situation;
   c. recording each access of the resource data made by the individual, and the responses produced by the individual to resolve the simulated situation, thereby producing raw subject data;
   d. statistically analyzing the raw subject data to produce a statistical database in which are compiled the accesses made by the individual of the resource data and the responses of the individual to resolve the simulated situation; and
   e. using the statistical database, generating a report that generally characterizes the task-processing style of the individual in respect to a plurality of preselected parameters that are determined according to a set of predefined rules.

2. The method of claim 1, further comprising the step of training the individual before assessing the individual's task-processing style, to assist the individual in learning to use the computer-controlled display and in entering specific response data in resolving the simulated situation.

3. The method of claim 1, wherein the step of making available resource data comprises the step of providing the individual with a plurality of screens that are each selectively displayed on the computer-controlled display, each screen presenting the resource data.

4. The method of claim 1, wherein the step of making available resource data comprises the step of providing the individual with a plurality of graphic icons that are displayed on the computer-controlled display, so that when selected by the individual, each graphic icon causes a different aspect of the resource data to be displayed on the computer-controlled display.

5. The method of claim 1, wherein the available resource data are organized as a plurality of data types that are presented to the individual on the computer-controlled display as a plurality of choices from which the individual can select view at least one data type on the computer-controlled display at a time.

6. The method of claim 5, wherein selection of one of the plurality of data types by the individual causes additional choices of data to be displayed on the computer-controlled display for selection by the individual, each selection by the individual comprising an access of the resource data that is recorded in a sequential order that it occurs and is characterized as an input to the individual in producing the raw subject data.

7. The method of claim 6, further comprising the step of providing a plurality of choices on the computer-controlled display from which the individual can select at least one choice to develop at least a partial resolution of the simulated situation, each such choice being characterized as an output by the individual in producing the raw subject data.

8. The method of claim 7, wherein the step of statistically analyzing the raw subject data includes the step of determining a sequential order, frequency, and time durations of the input and the output, and wherein the step of generating the report comprises the step of defining a relative order, frequency, and time duration of the input and the output by the individual.

9. The method of claim 8, wherein the output comprises a plurality of types of production, and wherein the step of statistically analyzing the raw subject data further includes the step of determining the relative proportion of output for each type of production.

10. The method of claim 9, wherein the types of production include conceptual, selective, and implementive, and wherein the step of generating the report further comprises the step of defining the types of production exhibited by the individual in resolving the simulated situation and the relative proportion of each type.

11. The method of claim 1, further comprising the steps of presenting a plurality of options organized as an array on the computer-controlled display, and recording a sequential order in which each of the options is selectively accessed by the individual, the sequential order of such accesses comprising a portion of the raw subject data.

12. The method of claim 11, wherein the step of statistically analyzing the raw subject data includes a determination of the individual's methodicalness, and wherein the step of generating a report comprises the step of defining the methodicalness of the individual as one of the preselected parameters.

13. The method of claim 1, wherein the step of statistically analyzing the raw subject data includes the step of determining an average number of accesses of the resource data before the individual made a decision, to determine how decisive and selective the individual is.

14. The method of claim 13, wherein generating the report includes the step of defining a decisive-selective characteristic for the individual as one of the preselected parameters.

15. The method of claim 1, wherein a resolution of the simulated situation comprises a plurality of loosely defined components, and wherein the step of statistically analyzing the raw subject data includes the step of determining an extent to which sequential responses by the individual in resolving the simulated situation either were directed to a specific component of the resolution, thereby indicating that the individual exhibits a specific implementation method, or were generally directed to different components, indicating that the individual exhibits a general implementation method.

16. The method of claim 15, wherein the step of generating the report includes the step of defining a general-specific characteristic for the individual as one of the preselected parameters.

17. The method of claim 1, wherein the step of generating the report comprises the step of producing a graphic representation of a corresponding task-processing characteristic of the individual that is one of the preselected parameters.

18. A computer for assessing an individual's task-processing style, comprising:
i a. a central processing unit;
b. memory means for storing:
i. instructions that control the central processing unit;
ii. scenario data defining a simulated situation that is to be resolved by the individual;
iii. resource data, of which, at least a portion is useful in resolving the simulated situation; and
iv. response data that represent at least a part of the individual's resolution of the simulated situation;
c. display means, connected to the central processing unit, for displaying:
i. the scenario data;
ii. specific resource data selectively accessed by the individual; and
iii. specific response data provided by the individual in resolving the simulated situation;
d. entry means, electrically connected to the central processing unit, for enabling the individual to select the specific resource data for display on the display means and for entering the specific response data into the memory means;
e. statistical analysis means, for analyzing the specific resource data selected by the individual and its sequential order of selection, and for analyzing the specific response data, producing a statistical database that is stored by the memory means; and
f. report generation means for generating a report from the statistical database that defines the individual's task-processing style in respect to a plurality of preselected parameters in accord with predefined rules.

19. The system of claim 18, wherein the instructions that control the central processing unit comprise a training session for the individual implemented before assessing the individual's task-processing style for insuring the individual knows how to use the entry means and how to select from a plurality of options presented on the display means.

20. The system of claim 18, wherein the scenario data are organized as a plurality of data types presented to the individual on the display means as a plurality of choices from which the individual selectively chooses using the entry means, the data type selected by the individual comprising a portion of the specific response data stored by the memory means.

21. The system of claim 20, wherein selection of one data type by the individual causes the central processing means to display additional choices of data on the display means, and wherein selection of such data by the individual comprises a selective access of the resource data that is stored in the memory means in the sequence in which it occurs, for analysis by the statistical analysis means.

22. The system of claim 21, wherein the statistical analysis means determine a sequential order and a frequency with which the resource data are selected by the individual and with which the specific response data are provided by the individual, in producing the statistical database, and the report generation means use the statistical database to define a relative order, frequency, and time durations with which the resource data are accessed and specific responses are made by the individual.

23. The system of claim 22, wherein the responsive data are characterized in the statistical database as comprising a plurality of types of production, including conceptual, selective, and implementive production, and using the statistical database, the report generation means define a relative proportion of each type of production exhibited by the individual in resolving the simulated situation.

24. The system of claim 18, wherein one of the preselected parameters used by the report generation means in defining the individual's task-processing style is methodicalness, which is determined by the statistical analysis means as a function of an order and a pattern with which the individual accesses choices presented in an array on the display means.

25. The system of claim 18, wherein the statistical analysis means analyze accesses of the resource data by the individual to determine an average number of accesses made prior to the individual making a decision that comprises a specific response to produce the statistical database, and the report generation means use the statistical database to define a decisive-selective characteristic for the individual as one of the preselected parameters.

26. The system of claim 18, wherein a resolution of the simulated situation comprises a plurality of loosely defined components, and wherein the statistical analysis means determine an extent to which sequential responses by the individual in resolving the simulated simulation either were directed to a specific component, indicating a specific implementation method, or were directed to different components, indicating a general implementation method, and using the statistical database, the report generation means define a general-decisiveness characteristic of the individual as one of the preselected parameters.

27. The system of claim 18, wherein the display means comprise a touch-sensitive screen display, and wherein the scenario data and the resource data are presented to the individual on the touch-sensitive screen display, the entry means comprising means for detecting a portion of the touch-sensitive screen display touched by the individual to make a selection among a plurality of choices displayed thereon to selectively control and access the scenario data and the resource data.

28. The system of claim 18, wherein at least a portion of the specific response data comprises graphical icons that are selected and positioned by the individual on the display means using the entry means, the selection and arrangement of the icons comprising at least a portion of the resolution of the simulated situation.

* * * * *

UNITED STATES PATENT AND TRADEMARK OFFICE
CERTIFICATE OF CORRECTION

PATENT NO. : 5,326,270
DATED : July 5, 1994
INVENTOR(S) : Ostby et al.

It is certified that error appears in the above-indentified patent and that said Letters Patent is hereby corrected as shown below:

```
Column 2, line 12, "Psychologics" should read --Psychologica--
Column 2, line 24, after "presentation" insert --along with the latency of
  each aspect presentation--.
Column 2, line 38, "Etgener" should read --Ergener--
Column 13, line 24, "I" should read --1--
Column 19, line 10, "3 10" should read --310--
Column 19, line 11, "1" should read --I--
Column 19, line 12, "71" should read --7I--
Column 19, line 39, "1," should read --I,--
Column 26, line 40, "teaming" should read --learning--
Column 26, line 59, before "view" insert --to--
Column 27, line 45, before "generating" insert --the step of--
Column 28, line 3, before "a." delete "i"
Column 30, line 2, "simulation" should read --situation--
```

Signed and Sealed this

Twenty-seventh Day of September, 1994

Attest:

BRUCE LEHMAN

Attesting Officer

Commissioner of Patents and Trademarks